United States Patent
Oda et al.

(10) Patent No.: US 11,244,109 B2
(45) Date of Patent: Feb. 8, 2022

(54) INFORMATION PROCESSING DEVICE AND INFORMATION PROCESSING METHOD

(71) Applicant: HITACHI, LTD., Tokyo (JP)

(72) Inventors: Takuya Oda, Tokyo (JP); Tadashi Takeuchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 62 days.

(21) Appl. No.: 16/829,041

(22) Filed: Mar. 25, 2020

(65) Prior Publication Data
US 2020/0387667 A1 Dec. 10, 2020

(30) Foreign Application Priority Data

Jun. 7, 2019 (JP) .............................. JP2019-106812

(51) Int. Cl.
*G06F 17/00* (2019.01)
*G06F 40/247* (2020.01)
*G06F 40/289* (2020.01)
*G06F 40/30* (2020.01)

(52) U.S. Cl.
CPC .......... *G06F 40/247* (2020.01); *G06F 40/289* (2020.01); *G06F 40/30* (2020.01)

(58) Field of Classification Search
CPC ....... G06F 40/247; G06F 40/289; G06F 40/30
See application file for complete search history.

(56) References Cited

U.S. PATENT DOCUMENTS

| 8,682,907 B1* | 3/2014 | Yang ................... G06F 16/3334 707/750 |
| 9,037,464 B1 | 5/2015 | Mikolov et al. |
| 2014/0195348 A1* | 7/2014 | Sun ................... G06Q 30/0256 705/14.54 |

FOREIGN PATENT DOCUMENTS

JP 2011-003156 A 1/2011

OTHER PUBLICATIONS

Morita et al., Word Classification and Hierarchy using Co-occurrence Word Information, Elsevier, 2003, p. 957-972 (Year: 2003).*

Lemaire et al., Effects of High-Order Co-occurrences on Word Semantic Similarity, current phsychology letters, 2006, p. 1-12 (Year: 2006).*

* cited by examiner

*Primary Examiner* — Andrew T McIntosh

(74) *Attorney, Agent, or Firm* — Mattingly & Malur, PC

(57) ABSTRACT

An information processing device specifies a plurality of cooccurrence words common to first and second words, and determines synonymity or relevancy about the first word and the second word based on cooccurrence indices between the specified cooccurrence words and each of the first and second words. More specifically, the information processing device selects, from among the specified cooccurrence words, one cooccurrence word in which at least one of cooccurrence indices between the specified cooccurrence word and the first and second words does not exceed a preset first threshold, and obtains a difference in cooccurrence index between each selected cooccurrence word and each of the first and second words, if the difference exceeds a preset second threshold, the information processing device determines the first and second words as relevant word candidates, and if the difference does not exceed the second threshold, the information processing device determines them as synonym candidates.

8 Claims, 25 Drawing Sheets

COOCCURRENCE INDICES BETWEEN EACH OF SPECIFIED COOCCURRENCE WORDS AND EACH OF FIRST AND TWO SECOND WORDS

| | WORD | COOCCURRENCE WORD | | | | |
|---|---|---|---|---|---|---|
| | | LIPID | CHOLESTEROL | METABO | BLOOD | SUBCUTANEOUS FAT |
| FIRST WORD | DYSLIPIDEMIA | 0.8 | 0.7 | 0.7 | 0.5 | 0.1 |
| SECOND WORD | HYPERLIPIDEMIA | 0.8 | 0.7 | 0.7 | 0.7 | 0.2 |
| SECOND WORD | OBESITY | 0.8 | 0.8 | 0.7 | 0.2 | 0.6 |

ATTRIBUTE RELATION TABLE 161

| ATTRIBUTE P | ATTRIBUTE Pr |
|---|---|
| DISEASE | MEDICINE |
| DISEASE | SYMPTOM |
| DISEASE | DISEASE |
| MEDICINE | DISEASE |
| MEDICINE | SYMPTOM |
| MEDICINE | EFFECT |
| : | : |

FIG. 4

WORD-ATTRIBUTE CORRESPONDENCE TABLE 162

| ATTRIBUTE | WORD |
|---|---|
| DISEASE | DIABETES |
| DISEASE | DYSLIPIDEMIA |
| DISEASE | HYPERLIPIDEMIA |
| DISEASE | ... |
| MEDICINE | INSULIN |
| MEDICINE | MEVALOTIN |
| MEDICINE | ... |
| : | : |

DOCUMENT-ATTRIBUTE TAG CORRESPONDENCE TABLE 151

| DOCUMENT ID | POSITION | WORD ID | WORD | ATTRIBUTE |
|---|---|---|---|---|
| DOCUMENT 1 | FOURTH WORD IN THIRD PARAGRAPH | A-1 | DIABETES | DISEASE |
| ... | ... | ... | ... | ... |

RELATED WORD CORRESPONDENCE TABLE 152

| WORD ID 1521 | WORD 1522 | NUMBER-OF-APPLICATIONS OF ATTRIBUTE RELATION (HOP COUNT) 1523 | RELATED WORD ID 1524 | RELATED WORD 1525 |
|---|---|---|---|---|
| A-1 | DISEASE NAME 1 | 1 | B-1 | MEDICINE NAME 1 |
| A-1 | DISEASE NAME 1 | 2 | C-2 | SYMPTOM NAME 2 |
| .. | .. | .. | .. | .. |

FIG. 8

WORD COOCCURRENCE INDEX CALCULATION RESULTS 153

| WORD T1 | WORD T2 | COOCCURRENCE INDEX |
|---|---|---|
| DYSLIPIDEMIA | INSULIN | 0.20 |
| DYSLIPIDEMIA | MEVALOTIN | 0.75 |
| DYSLIPIDEMIA | ... | ... |
| : | : | |
| MEVALOTIN | DYSLIPIDEMIA | 0.75 |
| MEVALOTIN | DIABETES | 0.30 |
| MEVALOTIN | HYPERLIPIDEMIA | 0.76 |
| : | : | : |

1531  1532  1533

SYNONYM CANDIDATES

FIG. 9

| WORD | COOCCURRENCE INDICES BETWEEN EACH OF SPECIFIED COOCCURRENCE WORDS AND EACH OF FIRST AND TWO SECOND WORDS | | | | |
|---|---|---|---|---|---|
| | COOCCURRENCE WORD | | | | |
| | LIPID | CHOLESTEROL | METABO | BLOOD | SUBCUTANEOUS FAT |
| FIRST WORD — DYSLIPIDEMIA | 0.8 | 0.7 | 0.7 | 0.5 | 0.1 |
| SECOND WORD — HYPERLIPIDEMIA | 0.8 | 0.7 | 0.7 | 0.7 | 0.2 |
| SECOND WORD — OBESITY | 0.8 | 0.8 | 0.7 | 0.2 | 0.6 |

FIG. 11

FIRST AND SECOND WORDS AND AVERAGE
DIFFERENCES IN COOCCURRENCE INDEX

| FIRST WORD | SECOND WORD | COOCCURRENCE WORD DIFFERENCE |
|---|---|---|
| DYSLIPIDEMIA | HYPERLIPIDEMIA | 0.15 |
| DYSLIPIDEMIA | OBESITY | 0.4 |

FIG. 12

EXAMPLES OF SYNONYM CANDIDATE AND
RELEVANT WORD CANDIDATE DETERMINED BY
SYNONYM DETERMINATION METHOD (2)
AND RELEVANT WORD DETERMINATION METHOD

| WORD | SYNONYM CANDIDATE | RELEVANT WORD CANDIDATE |
|---|---|---|
| DYSLIPIDEMIA | HYPERLIPIDEMIA | OBESITY |

FIG. 13

SYNONYM DICTIONARY
(SIMILAR TO RELEVANT WORD DICTIONARY)

163

| REPRESENTATIVE WORD | WORD | ATTRIBUTE | DICTIONARY ID |
|---|---|---|---|
| DYSLIPIDEMIA | DYSLIPIDEMIA | DISEASE NAME | DICTIONARY 001 |
| DYSLIPIDEMIA | HYPERLIPIDEMIA | DISEASE NAME | DICTIONARY 001 |
| DYSLIPIDEMIA | HYPERGLYCERIDEMIA | DISEASE NAME | DICTIONARY 001 |
| DYSLIPIDEMIA | HYPERCHOLESTEROLEMIA | DISEASE NAME | DICTIONARY 001 |
| DYSLIPIDEMIA | HYPERLIPOPROTEINEMIA | DISEASE NAME | DICTIONARY 001 |
| DYSLIPIDEMIA | ALIMENTARY HYPERLIPEMIA | DISEASE NAME | DICTIONARY 001 |
| DYSLIPIDEMIA | ESSENTIAL HYPERLIPIDEMIA | DISEASE NAME | DICTIONARY 001 |
| .. | .. | .. | .. |
| PERIODONTAL DISEASE | PERIODONTAL DISEASE | DISEASE NAME | DICTIONARY 005 |
| PERIODONTAL DISEASE | PERIODONTAL DISORDER | DISEASE NAME | DICTIONARY 005 |
| PERIODONTAL DISEASE | PELLIOT | DISEASE NAME | DICTIONARY 005 |
| PERIODONTAL DISEASE | PYORRHEA ALVEOLARIS | DISEASE NAME | DICTIONARY 005 |

FIG. 14

SYNONYM EXCLUSION LIST
(SIMILAR TO RELEVANT WORD EXCLUSION LIST)

164

| WORD T1 | WORD T2 | ATTRIBUTE |
|---|---|---|
| COLD | INFLUENZA | DISEASE NAME |
| COLD | MUMPS | DISEASE NAME |
| MEASLES | RUBELLA | DISEASE NAME |
| : | : | : |
| ASTHMA | CHRONIC BRONCHITIS | DISEASE NAME |
| ASTHMA | ALLERGIC RHINITIS | DISEASE NAME |
| : | : | : |

FIG. 15

INFORMATION PROCESSING DEVICE AND INFORMATION PROCESSING METHOD

CROSS-REFERENCE TO RELATED APPLICATION

This application claims priority pursuant to 35 U.S.C. § 119 from Japanese Patent Application No. 2019-106812, filed on Jun. 7, 2019, the entire disclosure of which is incorporated herein by reference.

BACKGROUND

Technical Field

The present invention relates to an information processing device and an information processing method.

Related Art

U.S. Pat. No. 9,037,464 discloses a synonym extraction system that extracts synonyms from documents including synonyms that are recognized in a document group related to a specific matter, such as proposals and specifications related to information system construction. The synonym extraction system accepts an entry of a target document or a target document group, extracts all words used in respective sentences and extracts word metric information, which is quantitative features of words, and word information, which is qualitative features of words, creates context information on context in which each word is used, for each word used in each extracted sentence, by using the word information, calculates a similarity between respective word context information, as context degree-of-similarity of each word combination, by a context degree-of-similarity calculation method, creates notation information on character configuration of each word, for each word used in each extracted sentence, and calculates a similarity between respective word notation information, as notation degree-of-similarity of each word combination, by a notation degree-of-similarity calculation method.

Japanese Laid-open Patent Publication No. 2011-3156 discloses a data classification device that classifies data sets. The data classification device repetitively executes processing for determining a data representing each cluster, for each cluster belonging to a lowermost layer, in a hierarchical cluster structure in which each data included in the data set is hierarchically clustered, determining a data representing a cluster having a high centricity among respective clusters as a data representing a cluster belonging to a hierarchy higher by one than the lowermost layer, among respective data determined by lowermost layer representative data determination means, and further performing processing for determining a data representing a cluster having a high centricity and belonging to a processing target hierarchy as a data representing a cluster belonging to a hierarchy higher by one than the processing target hierarchy until reaching an uppermost layer.

For example, in a medical institute such as a hospital or a pharmacy, the verification process such as a process for checking a mistake in entry of a medical prescription or an improper billing requires enormous manpower although an information processing system is available in an auxiliary manner. In such a verification process, when a keyword search function is used to search documents, the search accuracy can be enhanced by using, as search keywords, not only each search word designated by a user but also synonyms and relevant words related to the designated search word. In addition, presenting the user with the synonyms and the relevant words separately enables the user to set the search keyword appropriately and flexibly, and therefore the search accuracy can be enhanced.

According to the technique disclosed in U.S. Pat. No. 9,037,464 described above, to improve the accuracy in synonym determination, learning using enormous data for linking words appearing in a document by appearance probability is necessary. Further, according to the technique disclosed in Japanese Laid-open Patent Publication No. 2011-3156, since it extracts subordinate concepts having a common superordinate concept as synonyms, in order to enhance the accuracy in extraction of synonyms and relevant words, it is necessary to assign sufficient attributes to the data and accordingly the human load imparted for this is a problem.

SUMMARY

In view of the above circumstances, the present invention intends to provide an information processing device and an information processing method capable of improving the accuracy in determining synonyms and relevant words while reducing the human workload.

An aspect of the present invention for achieving the above object is an information processing device that specifies a plurality of cooccurrence words common to a first word and a second word, and determines synonymity or relevancy about the first word and the second word based on cooccurrence indices between the specified cooccurrence words and each of the first and second words.

In addition, problems to be disclosed in the present application and methods for solving the problems will be clarified by the following description of embodiments for carrying out the invention and attached drawings.

The present invention ensures improving the accuracy in determining synonyms and relevant words while reducing the human workload.

BRIEF DESCRIPTION OF THE DRAWINGS

FIG. 2 is a block diagram illustrating an example of an information processing device that configures a document search device or the like;

FIG. 4 illustrates an example of an attribute relation table;

FIG. 5 illustrates an example of a word-attribute correspondence table;

FIG. 7 illustrates an example of a document-attribute tag correspondence table;

FIG. 8 illustrates an example of a related word correspondence table;

FIG. 9 illustrates exemplary word cooccurrence index calculation results;

FIG. 11 illustrates exemplary cooccurrence indexes between first and second words and relevant cooccurrence words;

FIG. 12 illustrates exemplary differences in cooccurrence index obtained between the first word and the second word, for cooccurrence words selected by a first threshold;

FIG. 13 illustrates exemplary determination results of a synonym candidate and a relevant word candidate by a synonym specifying method (2) and a relevant word specifying method;

FIG. 14 illustrates an example of a synonym dictionary;

FIG. 15 illustrates an example of a synonym exclusion list;

DETAILED DESCRIPTION OF EMBODIMENTS

Figure 1:
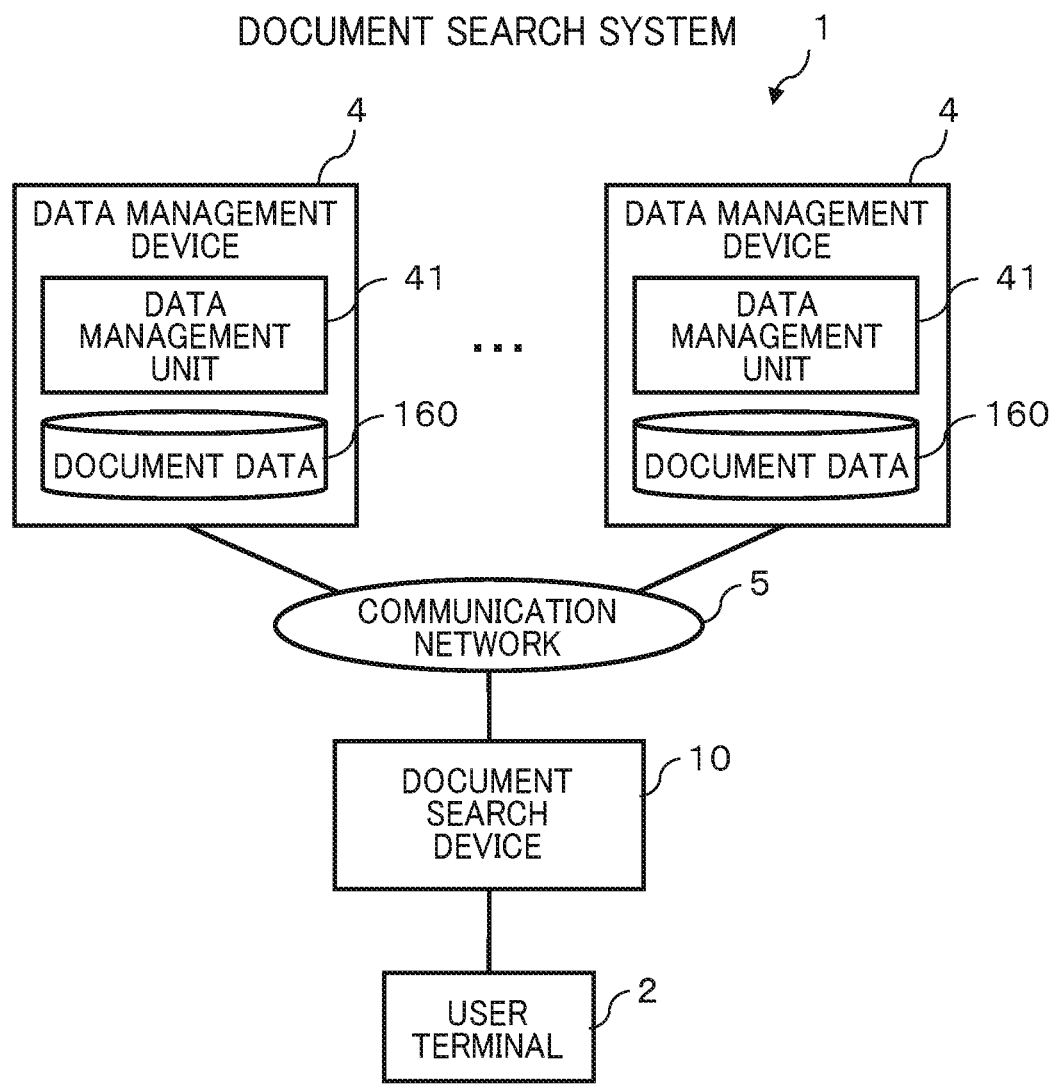
FIG. 1 is a block diagram illustrating a schematic configuration of a document search system.

Hereinafter, embodiments will be described with reference to the drawings. In the following description, the same or similar components or configurations may be denoted by the same reference numerals and redundant description thereof may be omitted. Further, in the following description, when it is necessary to distinguish between similar components or configurations, an identifier (numeral, alphabet, or the like) may be affixed in parentheses after each reference numeral representing the component or configuration.

FIG. 1 is a block diagram illustrating an exemplary configuration of an information processing system (hereinafter, referred to as "document search system 1") according to a first embodiment. The document search system 1 includes a document search device 10, one or more data management devices 4, and a user terminal 2. Information processing devices (computers) configure these constituent components. The document search device 10 is communicably connected to each data management device 4 via a communication network 5. Further, the document search device 10 is communicably connected to the user terminal 2.

The communication network 5 is wired or wireless communication means, such as a local area network (LAN), a wide area network (WAN), WiFi (registered trademark), the Internet, a dedicated line, a public communication network, or communication means conforming to USB (universal serial bus) or RS-232C standards. The communication network 5 may be a combination of a plurality of types of communication means.

In the present embodiment, the document search device 10, the data management devices 4, and the user terminal 2 are described as independent devices. However, the whole or a part of these constituent elements may be configured as a common device. For example, the document search device 10 and the data management device 4 may be the same device. Further, the document search device 10 and the user terminal 2 may be the same device.

As illustrated in the drawing, the data management device 4 includes a data management unit 41 as a functional unit (a processing unit) and stores document data 160. The document data 160 is, for example, medical prescriptions and bills at medical sites, but the type of the document data 160 is not limited. Therefore, for example, the document data 160 may be document data handled in an organization such as a company or a government office. The data management device 4 communicates with the document search device 10, and provides (transmits) the document data 160 to the document search device 10.

The document search device 10 performs a keyword search on target document data. The document search device 10 is, for example, provided at a management base where the management of the document data 160 is performed. The document search device 10 determines the synonymity or relevancy about words extracted from the document data 160 provided from the data management device 4. Hereinafter, two or more words that are mutually synonymous are referred to as a set of synonyms, and two or more words relevant to each other are referred to as a set of relevant words. The document search device 10 determines, by a below-described determination method, whether two or more words are a set of synonyms or relevant words.

The document search device 10 assigns an attribute (label) to each word extracted from the document data 160. The attribute is information indicating the type of each word grasped from the meaning and content of the word. For example, the document search device 10 assigns an attribute "disease name" to words such as "gastritis", "dyslipidemia", "hyperlipidemia", or "obesity". Further, for example, the document search device 10 assigns an attribute "medicine" to words such as "stomach medicine", "analgesic", or "headache medication".

The document search device 10 obtains a cooccurrence index between words extracted from the document data 160. The cooccurrence index is an index indicating how often another word appears in a sentence when a certain word appears in this sentence. The cooccurrence index can be obtained, for example, from a word vector distance, which is obtainable from "word2vec". The document search device 10, using the cooccurrence index, determines the synonymity or relevancy between words extracted from the document data 160.

Figure 2:
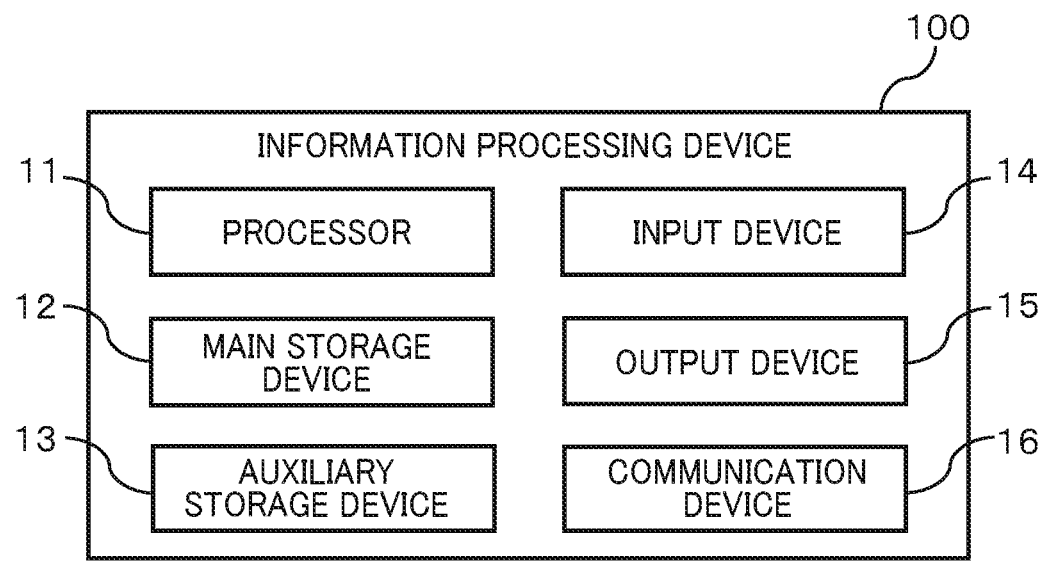

FIG. 2 is a block diagram illustrating an exemplary information processing device that realizes the document search device 10, the data management devices 4, and the user terminal 2. As apparent from the drawing, the illustrated information processing device 100 includes a processor 11, a main storage device 12, an auxiliary storage device 13, an input device 14, an output device 15, and a communication device 16. The information processing device 100 may be realized, for example, using a cloud server provided by a cloud system or comparable virtual information processing resources. Further, the information processing device 100 may be realized, for example, as a container deployed on a container base.

The processor 11 is configured using, for example, a central processing unit (CPU), a micro processing unit (MPU), a graphics processing unit (GPU), a field programmable gate array (FPGA), an application specific integrated circuit (ASIC), an artificial intelligence (AI) chip, or the like.

The main storage device 12 is a device for storing programs and data, and is, for example, a read only memory (ROM), a random access memory (RAM), a nonvolatile memory (Non Volatile RAM (NVRAM)), or the like.

The auxiliary storage device 13 is, for example, a hard disk drive, a solid state drive (SSD), an optical storage device (a compact disc (CD), a digital versatile disc (DVD), or the like), a storage system, a reading/writing device of a recording medium such as an IC card, an SD card, or an optical recording medium, or a storage area of a cloud server. Programs and data can be read into the auxiliary storage device 13 via a recording medium reading device or the communication device 16. The programs and data stored in the auxiliary storage device 13 can be read, when needed, into the main storage device 12.

The input device 14 is an interface that receives an input from the outside, and is, for example, a keyboard, a mouse, a touch panel, a card reader, a stylus input tablet, a voice input device, or the like.

The output device 15 is an interface that outputs various information including the progress of processing, results of the processing, and the like. The output device 15 is, for example, a display device (e.g., a liquid crystal monitor, a liquid crystal display (LCD), a graphics card, or the like) capable of visualizing the above-mentioned various information, an audio device (a voice output device (a speaker or the like)) capable of converting the above-mentioned various information into voice, or a device (a printing device or the like) capable of converting the above-mentioned various information into characters. Note that, for example, the information processing device 100 may be configured to input and output information, via the communication device 16, from and to other devices.

The communication device 16 is a device that realizes communications with other devices. The communication device is a wired or wireless communication interface that realizes communications with other devices via the communication network 5, and is, for example, a network interface card (NIC), a wireless communication module, a USB module, a serial communication module, or the like.

Functions of the document search device 10, the data management devices 4, and the user terminal 2 can be realized by the processor 11 when reading out and executing the programs stored in the main storage device 12, or by hardware (FPGA, ASIC, AI chip, and the like) that configures these devices.

For example, an operating system, a device driver, a file system, a DataBase Management System (DBMS), or the like may be installed in the document search device 10, the data management devices 4, and the user terminal 2.

Figure 3:
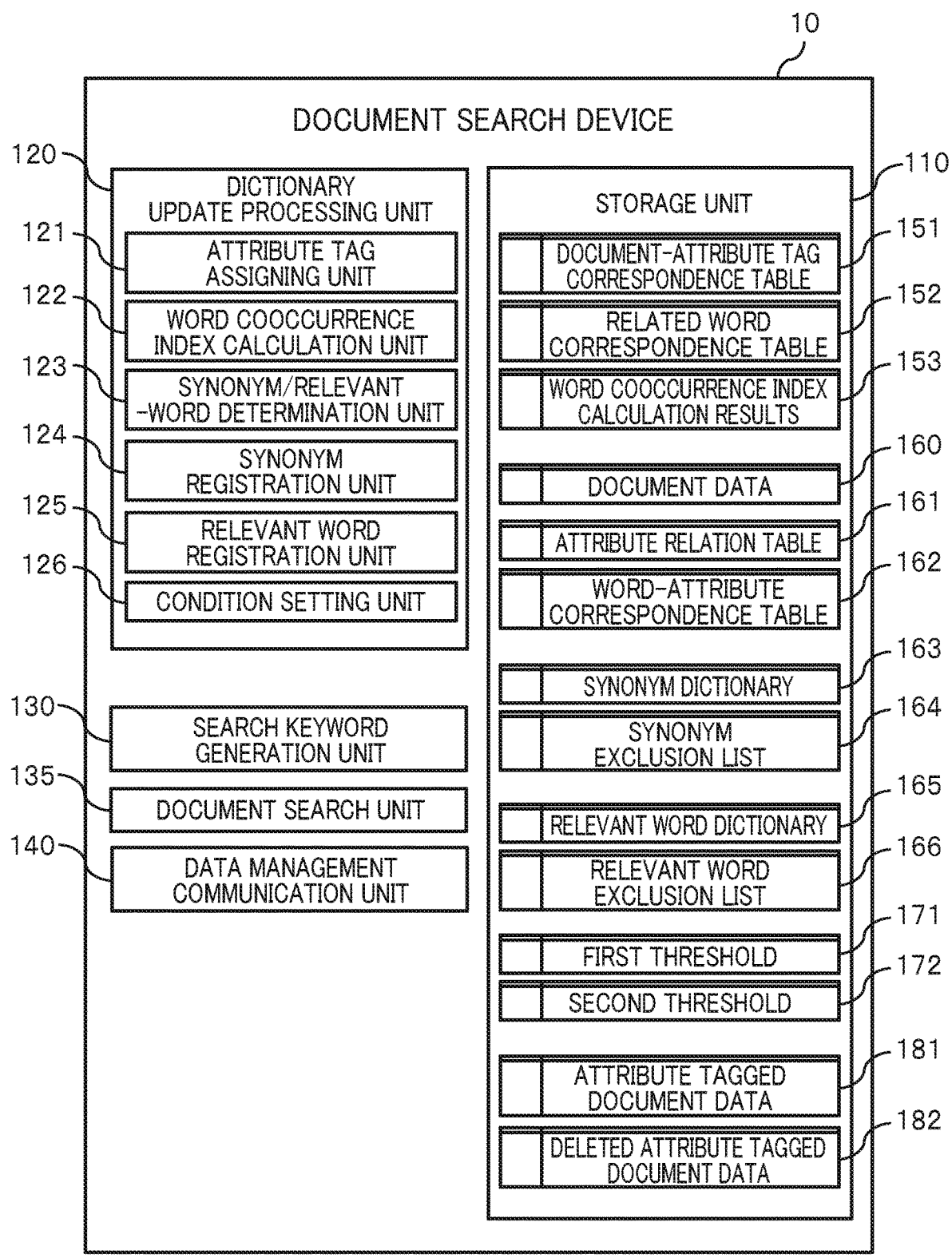
FIG. 3 is a diagram illustrating main functions of the document search device.

FIG. 3 illustrates main functions of the document search device 10. As illustrated in the drawing, the document search device 10 includes, as functional units, a storage unit 110, a dictionary update processing unit 120, a search keyword generation unit 130, a document search unit 135, and a data management communication unit 140. The dictionary update processing unit 120 includes an attribute tag assigning unit 121, a word cooccurrence index calculation unit 122, a synonym/relevant-word determination unit 123, and a synonym registration unit 124. These functions can be realized by the processor 11 when reading out and executing programs stored in the main storage device 12, or by hardware (FPGA, ASIC, AI chip, or the like) provided in the document search device 10.

The storage unit 110 stores a document-attribute tag correspondence table 151, a related word correspondence table 152, and word cooccurrence index calculation results 153, the document data 160, an attribute relation table 161, a word-attribute correspondence table 162, a synonym dictionary 163, a synonym exclusion list 164, a relevant word dictionary 165, a relevant word exclusion list 166, a first threshold 171, a second threshold 172, an attribute tagged document data 181, and a deleted attribute tagged document data 182. The storage unit 110 stores these types of information (data), for example, as database tables provided by the DBMS or files provided by the file system.

The document-attribute tag correspondence table 151 is for managing information indicating the position and the word to which the attribute tag is assigned in the document data 160. The related word correspondence table 152 is for managing a correspondence between words having mutually related attributes. The word cooccurrence index calculation results 153 are for managing cooccurrence index calculation results between words having mutually related attributes.

The document data 160 is document data 160 acquired from the data management devices 4. The document data 160 is, for example, text data in which one or more sentences are described. However, the data format of the document data 160 may be any format as long as word search is feasible.

The attribute relation table 161 is for managing the relevancy between attributes registered in the word-attribute correspondence table 162. The word-attribute correspondence table 162 is for managing the correspondence between the word and the attribute.

The synonym dictionary 163 is for registering words determined as being synonyms. The synonym exclusion list 164 is for registering words that are not actually synonymous.

The relevant word dictionary 165 is for managing words determined as being relevant words. The relevant word exclusion list 166 is for managing words that are not actually relevant.

The first threshold 171, the second threshold 172, the attribute tagged document data 181, and the deleted attribute tagged document data 182 will be described in detail below.

The dictionary update processing unit 120 illustrated in FIG. 3 determines the synonymity or relevancy between words extracted from the document data 160 to perform dictionary registration. As illustrated in the drawing, the dictionary update processing unit 120 includes the attribute tag assigning unit 121, the word cooccurrence index calculation unit 122, the synonym/relevant-word determination unit 123, the synonym registration unit 124, and a relevant word registration unit 125.

The attribute tag assigning unit 121 among them assigns (sets), to the word extracted from the document data 160, an attribute tag that is information indicating an attribute thereof.

The word cooccurrence index calculation unit 122 obtains a cooccurrence index between words (including cooccurrence words described below) extracted from the document data 160.

The synonym/relevant-word determination unit 123 determines whether to designate two words extracted from the document data 160 as synonym candidates (a set of words in a synonym relationship) or as relevant word candidates (a set of words in a relevant word relationship).

The synonym registration unit 124 presents a user with the synonym candidates determined by the synonym/relevant-word determination unit 123, via the user terminal 2, and in response to a user's registration operation to the user terminal 2, registers the presented set of words as synonyms in the synonym dictionary 163.

The relevant word registration unit 125 presents a user with the relevant word candidates determined by the synonym/relevant-word determination unit 123, via the user terminal 2, and in response to a user's registration operation to the user terminal 2, registers the presented set of words as relevant words in the relevant word dictionary 165.

The search keyword generation unit 130 illustrated in FIG. 3 generates search keywords to be used in searching the document data 160. The search keyword generation unit 130, when generating the search keyword, expands the search keywords accepted from the user by appropriately using the synonym dictionary 163 and the relevant word dictionary 165.

The document search unit 135 searches the document data 160 using the search keywords generated by the search keyword generation unit 130.

The data management communication unit 140 provides a function related to communications of information (data) exchanged with the data management device 4 and the user terminal 2.

FIG. 4 illustrates an example of the attribute relation table 161. In the attribute relation table 161, a certain attribute (hereinafter, referred to as "attribute P") is managed together with information indicating another relevant attribute (hereinafter, referred to as "attribute Pr"). The illustrated attribute relation table 161 includes one or more records having respective items of attribute P1611 and attribute Pr 1612. In this example, when the attribute P is "disease", examples of the attribute Pr set as being relevant are "medicine", "symptom", and the like. Further, when the attribute P is "medicine", examples of the attribute Pr set as being relevant are "disease", "symptom", "effect", and the like.

FIG. 5 illustrates an example of the word-attribute correspondence table 162. In the word-attribute correspondence table 162, the correspondence between a word and an attribute assigned to this word is managed. The illustrated word-attribute correspondence table 162 includes one or more records having respective items of attribute 1621 and word 1622. In this example, an attribute set to words indicating disease names such as "diabetes", "dyslipidemia", and "hyperlipidemia" is "disease". An attribute set to words indicating medicine names such as "insulin" and "Mevalotin" is "medicine".

General attributes of words can be set as attributes in the word-attribute correspondence table 162. For example, the attribute "disease" can be set to thousands to tens of thousands of disease names, and the attribute "medicine" can be set to thousands to tens of thousands of medicine names. For this reason, even for thousands to tens of thousands of disease names and medicine names, it is no longer necessary to set sufficient and detailed attributes for synonym and relevant word determination. Therefore, the amount of human work for assigning sufficient attributes necessary for synonym and relevant word determination to words can be reduced. In addition, using the cooccurrence index between words having mutually relevant attributes in the synonym or relevant word determination can reduce the possibility of erroneously determining a word having no synonymity or relevancy as having synonymity or relevancy. And, it is possible to improve the synonym or relevant word determination accuracy.

Figure 6:
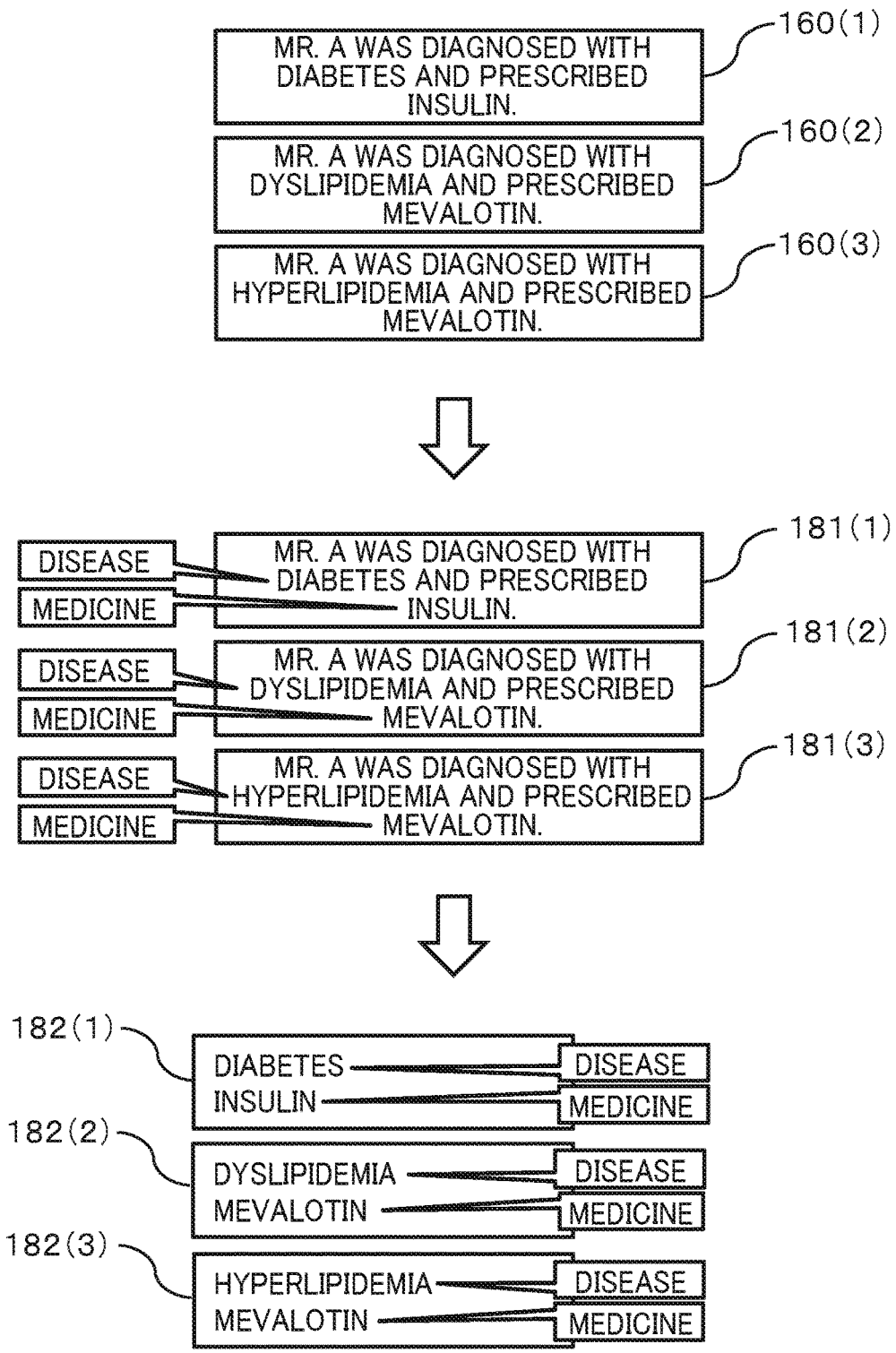
FIG. 6 is a diagram illustrating a state where an attribute tag is assigned to a word having an attribute selected from the attribute relation table.

FIG. 6 is a diagram illustrating a state in which the attribute tag assigning unit 121 assigns an attribute tag to a word having an attribute selected from the attribute relation table 161, for the words included in the document data 160. According to this example, attributes are assigned to words included in the document data 160 in the medical field. In this example, attribute tagged document data 181(1) to 181(3) are generated based on three document data 160(1) to 160(3).

As illustrated in the drawing, the attribute tag assigning unit 121 extracts words registered in the word-attribute correspondence table 162 from each of the document data 160(1) to 160(3), and assigns attribute tags each indicating an attribute associated in the word-attribute correspondence table 162 to the extracted words to generate the attribute tagged document data 181(1) to 181(3) for each document data 160.

For example, the attribute tagged document data 181(1) is an example of assigning the attribute tag "disease" to the word "diabetes" and assigning the attribute tag "medicine" to the word "insulin".

Further, the attribute tagged document data 181(2) is an example of assigning the attribute tag "disease" to the word "dyslipidemia" and assigning the attribute tag "medicine" to the word "Mevalotin".

Further, the attribute tagged document data 181(3) is an example of assigning the attribute tag "disease" to the word "hyperlipidemia" and assigning the attribute tag "medicine" to the word "Mevalotin".

The attribute tag assigning unit 121 generates, based on the attribute tagged document data 181(1) to 181(3), deleted attribute tagged document data 182(1) to 182(3) being data obtained by deleting words to which attribute tags are not assigned.

The attribute tag assigning unit 121 manages information based on the contents of the attribute tagged document data 181 as the document-attribute tag correspondence table 151.

FIG. 7 illustrates an example of the document-attribute tag correspondence table 151. The illustrated document-attribute tag correspondence table 151 includes one or more records having respective items of document ID 1511, position 1512, word ID 1513, word 1514, and attribute 1515. In the document ID 1511, each identifier of the document data 160 (hereinafter, referred to as "document ID") is set. In the position 1512, information indicating the position of each recorded word in the document is set. In the word ID 1513, each identifier of the word (hereinafter, referred to as "word ID") is set. In the word 1514, each word extracted from the recorded document data 160 is set. In the attribute 1515, each attribute assigned (set) to the word (which may be referred to as "attribute tag") is set.

The attribute tag assigning unit 121 manages information based on the contents of the generated deleted attribute tagged document data 182(1) to 182(3) as the related word correspondence table 152.

FIG. 8 illustrates an example of the related word correspondence table 152. The illustrated related word correspondence table 152 includes one or more records having respective items of word ID 1521, word 1522, attribute relation applied number-of-times 1523, related word ID 1524, and related word 1525. In the word ID 1521, each word ID is set. In the word 1522, each word is set. In the attribute relation applied number-of-times 1523, the number of times the attribute relation registered in the attribute relation table 161 has been applied is set. The attribute relation applied number-of-times 1523 will be described in detail below. In the related word ID 1524, each word ID of a word (hereinafter, referred to as "related word") having the attribute Pr related to the attribute P of the recorded word is set. In the related word 1525, each related word is set.

FIG. 9 illustrates an example of the word cooccurrence index calculation results 153 that the word cooccurrence index calculation unit 122 has generated based on the deleted attribute tagged document data 182. The word cooccurrence index calculation unit 122 obtains a cooccurrence index between words having mutually related attributes by applying, for example, "word2vec", to the deleted attribute tagged document data 182.

As illustrated in the drawing, the word cooccurrence index calculation results 153 includes one or more records having respective items of word T1531 and word T1532 set as words having mutually related attributes and cooccurrence index 1533 set as the cooccurrence index of these words.

In this example, an exemplary calculated value of the cooccurrence index between "dyslipidemia" (word T1) and "insulin" (word T2) is "0.20". Further, an exemplary calculated value of the cooccurrence index between "dyslipidemia" (word T1) and "Mevalotin" (word T2) is "0.75".

The synonym/relevant-word determination unit 123 refers to a cooccurrence index between a word having a first attribute and a word having a second attribute related to the first attribute and determines, based on the cooccurrence index, synonymity between words having the second attribute (hereinafter, this method is referred to as "synonym determination method (1)").

Specifically, the synonym/relevant-word determination unit 123 confirms the presence of two words T1 and T2 having mutually related attributes by checking whether the cooccurrence index between these words is equal to or greater than a preset lower limit, and if there is a set of words T2 having the same attribute among these words, determines that this set of words T2 are synonym candidates.

For example, it is supposed that the lower limit described above is set to "0.7", the attribute of "dyslipidemia" and "hyperlipidemia" (each being word T2) is "disease", and the attribute of "Mevalotin" (word T1) is "medicine". In this case, referring to the attribute relation table 161, the synonym/relevant-word determination unit 123 determines that two attributes "disease" and "medicine" are mutually related. Further, according to the word cooccurrence index calculation results 153, the cooccurrence index between "Mevalotin" (word T1) and "dyslipidemia" (word T2) is "0.75", and the cooccurrence index between "Mevalotin" (word T1) and "hyperlipidemia" (word T2) is "0.76". Accordingly, the cooccurrence index obtained between each of "dyslipidemia" and "hyperlipidemia" (each being word T2) and "Mevalotin" (word T1) is equal to or greater than the lower limit, and "dyslipidemia" and "hyperlipidemia" (each being word T2) have the same attribute "disease". Accordingly, the synonym/relevant-word determination unit 123 determines, based on the synonym determination method (1), that "dyslipidemia" and "hyperlipidemia" are a set of words that are mutually synonymous and determines this set of words as synonym candidates.

Further, the synonym/relevant-word determination unit 123 determines whether the set of first and second words determined as the synonym candidates by the synonym determination method (1) should be synonym candidates or relevant word candidates by the following method.

That is, first, the synonym/relevant-word determination unit 123 specifies a plurality of cooccurrence words common to both the first and second words, and determines the synonymity or relevancy about the first and second words based on cooccurrence indices between the specified cooccurrence words and the first and second words. More specifically, the synonym/relevant-word determination unit 123 selects, from among the specified cooccurrence words, each cooccurrence word if all the cooccurrence indices between this cooccurrence word and the first and second words do not exceed the preset first threshold 171, and obtains a difference in cooccurrence index between each of the selected cooccurrence words and the first and second words. Then, if the obtained difference exceeds the preset second threshold 172, the synonym/relevant-word determination unit 123 determines the first and second words as relevant word candidates (hereinafter, this method is referred to as "relevant word determination method"). On the other hand, if the obtained difference does not exceed the second threshold 172, the synonym/relevant-word determination unit 123 determines the first and second words as synonym candidates (hereinafter, this method is referred to as "synonym determination method (2)").

Figure 10:
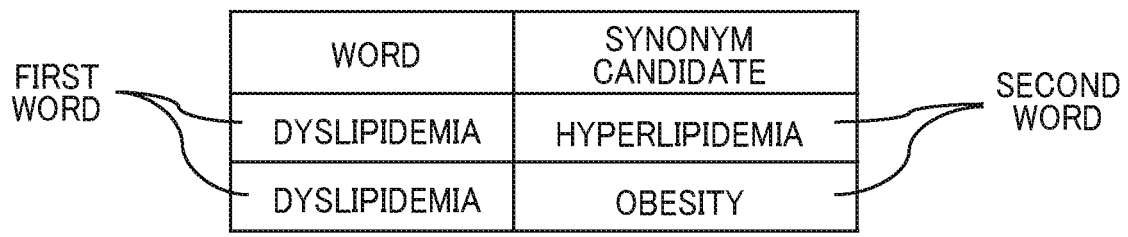
FIG. 10 illustrates examples of a first word and a second word specified as synonym candidates by a synonym determination method (1)

For example, FIG. 10 illustrates exemplary first and second words determined as synonym candidates by the synonym determination method (1). In this example, the synonym candidates determined for the first word "dyslipidemia" are "hyperlipidemia" and "obesity".

FIG. 11 illustrates the plurality of cooccurrence words common to the first and second words illustrated in FIG. 10 and exemplary cooccurrence indices between the first and second words and respective cooccurrence words.

In this example, if the first threshold 171 is set to "0.3", all the cooccurrence indices of cooccurrence words "lipid", "cholesterol", and "metabo" exceed the first threshold 171. However, some of the cooccurrence indices of cooccurrence words "blood" and "subcutaneous fat" do not exceed the first threshold 171. Therefore, each of the cooccurrence words "blood" and "subcutaneous fat" is selected by the first threshold.

FIG. 12 illustrates exemplary differences in cooccurrence index between the first and second words obtained for the cooccurrence words selected by the first threshold. Regarding the first word "dyslipidemia" and the second word "hyperlipidemia", the difference (average difference value) in cooccurrence index between the cooccurrence words "blood" and "subcutaneous fat" is "0.15" (=((0.7−0.5)+(0.2−0.1))/2). Regarding the first word "dyslipidemia" and the second word "obesity", the difference (average difference value) between cooccurrence words "blood" and "subcutaneous fat" is "0.4" (=((0.5−0.2)+(0.6−0.1))/2). The difference index used in this example is an average value of the difference in cooccurrence index between respective cooccurrence words. However, any other index obtainable by an appropriate method, for example, a sum of differences in cooccurrence index between respective cooccurrence words, is usable as the difference index.

In this example, if the second threshold 172 is set to "0.2", the synonym/relevant-word determination unit 123 determines the set of first word "dyslipidemia" and second word "hyperlipidemia" as synonym candidates by the synonym determination method (2) and determines the set of first word "dyslipidemia" and second word "obesity" as relevant word candidates by the relevant word determination method, as illustrated in FIG. 13.

The synonym registration unit 124 illustrated in FIG. 3 presents the user with the set of words determined as the synonym candidates as described above, via the user terminal 2. The user determines whether to register the presented set of words in the synonym dictionary 163. When the user performs an operation to instruct registration, the synonym registration unit 124 registers the above set of words in the synonym dictionary 163.

In addition, the relevant word registration unit 125 presents the user with the set of words determined as the relevant word candidate as described above, via the user terminal 2. The user determines whether to register the presented set of words in the relevant word dictionary 165. When the user performs an operation to instruct registration, the relevant word registration unit 125 registers the above set of words in the relevant word dictionary 165.

FIG. 14 illustrates an example of the synonym dictionary 163. The contents registered in the illustrated synonym dictionary 163 include representative word representing the synonym, word being synonymous with the representative word, attribute of the word, and dictionary ID for identifying the synonym dictionary. The relevant word dictionary 165 is similar in configuration to the synonym dictionary 163.

For example, it is now assumed that the synonym registration unit 124 presented, to a user, two words "cold" and "influenza" as synonym candidates, but the user has determined that these words are not synonyms and performed an un-registration operation. In this case, the synonym registration unit 124 registers "influenza" as a non-synonym of "cold", in the synonym exclusion list 164.

FIG. 15 illustrates an example of the synonym exclusion list 164 illustrated in FIG. 1. The contents registered in the illustrated synonym exclusion list 164 include words T1 and T2 that are not synonymous with each other and the attribute of these words T1 and T2.

The un-registration operation is feasible for relevant words. As in the case of synonyms, the relevant word registration unit 125 registers relevant word candidates that the user has designated by the un-registration operation, as non-relevant words, in the relevant word exclusion list. The relevant word dictionary 165 is similar in configuration to the synonym exclusion list 164.

Figure 16:
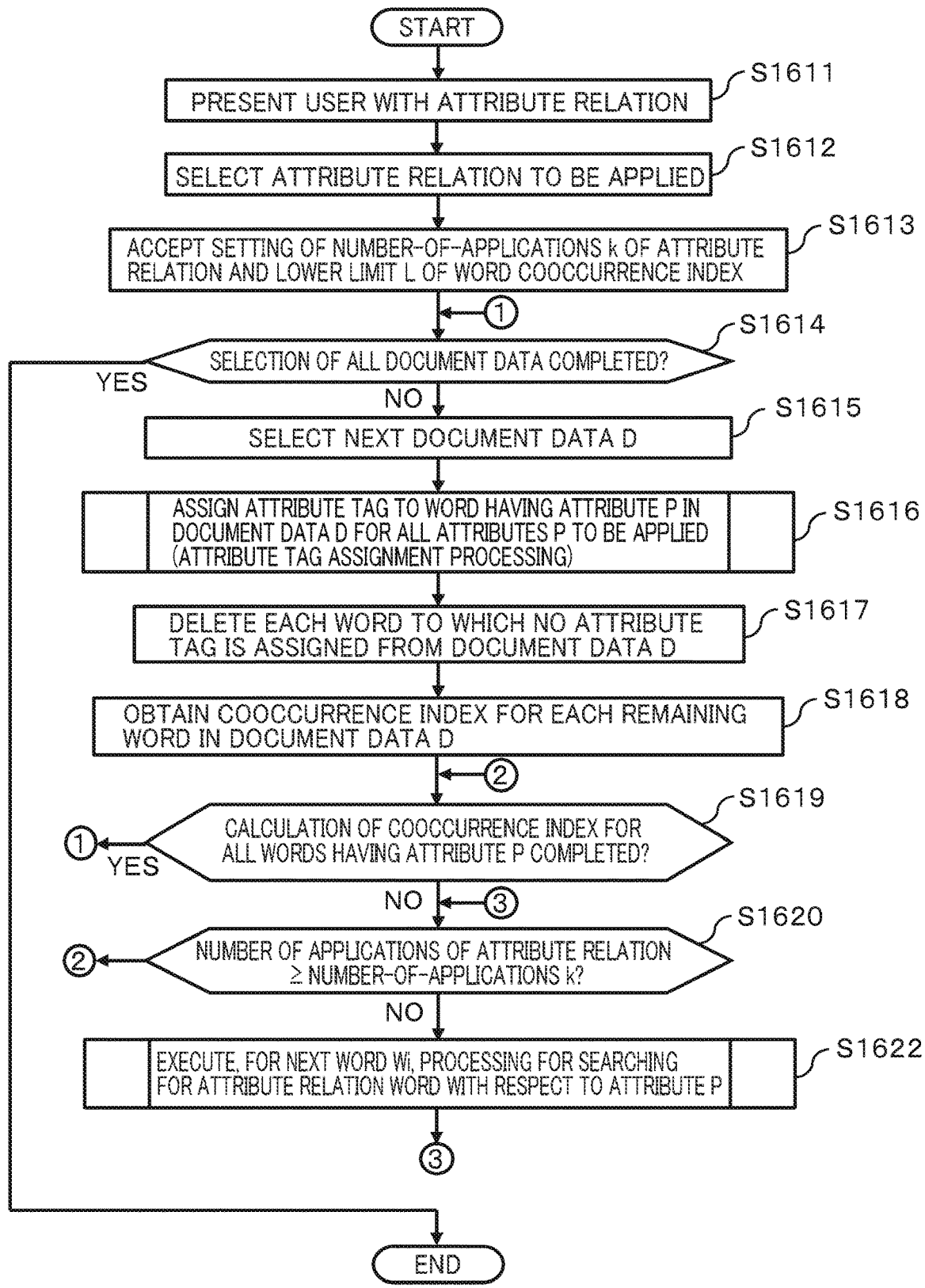
FIG. 16 is a flowchart illustrating dictionary update processing.

FIG. 16 is a flowchart illustrating processing (hereinafter, referred to as "dictionary update processing S1600") that the dictionary update processing unit 120 of the document search device 10 performs when updating the synonym dictionary 163 or the relevant word dictionary 165. Hereinafter, the dictionary update processing S1600 will be described with reference to the drawing.

First, the dictionary update processing unit 120 reads the attribute relation table 161 and presents attribute relations registered in the attribute relation table 161 to a user via the user terminal 2 (S1611). Then, the dictionary update processing unit 120 accepts a selected attribute relation (correspondence of attribute P and attribute Pr) to be used in the synonym or relevant word determination from the user via the user terminal 2 (S1612). Further, the dictionary update processing unit 120 accepts, from the user via the user terminal 2, the setting of number-of-applications k (k is a positive integer) of attribute relation and a lower limit L of word cooccurrence index (S1613).

Subsequently, in step S1614, the dictionary update processing unit 120 determines whether all the document data has been processed (selected in step S1615). If all the document data has been processed (YES in step S1614), the dictionary update processing unit 120 terminates the dictionary update processing S1600. On the other hand, if the processing of all the document data is not yet completed (NO in step S1614), the dictionary update processing unit 120 selects unprocessed document data D (S1615).

Subsequently, the dictionary update processing unit 120 refers to the word-attribute correspondence table 162 for all the attributes P applied to the determination, and assigns an attribute tag to the word having the attribute P in the document data D (hereinafter, this processing is referred to as "attribute tag assignment processing S1616") (S1616). At this time, the dictionary update processing unit 120 sets, in the document-attribute tag correspondence table 151, the position of the word in the document data D to which the attribute tag has been assigned.

Subsequently, the dictionary update processing unit 120 deletes each word to which no attribute tag is assigned from the document data D (S1617).

Subsequently, the dictionary update processing unit 120 obtains a cooccurrence index by using, for example, "word2vec", for each remaining word in the document data D from which the word to which no attribute tag is assigned has been deleted (S1618).

Subsequently, the dictionary update processing unit 120 determines whether the cooccurrence index has been calculated for each word having the attribute P in the document data D (S1619). When the calculation of the cooccurrence index has been completed for all the words having the attribute P in the document data D (YES in step S1619), the processing returns to step S1614. On the other hand, if the calculation of the cooccurrence index is not yet completed for all the words having the attribute P in the document data D (NO in step S1619), the dictionary update processing unit 120 determines whether the number of applications of the attribute relation has reached the number-of-applications k (S1620). When the number of applications of the attribute relation has reached the number-of-applications k (YES in step S1620), the processing returns to step S1619. If the number of applications of the attribute relation is less than the number-of-applications k (NO in step S1620), the dictionary update processing unit 120 executes, for the next word Wi, processing for searching for an attribute relation word with respect to the attribute P (hereinafter, this processing is referred to as "attribute relation word search processing S1622") (S1622). Subsequently, the processing returns to step S1620.

Figure 17:
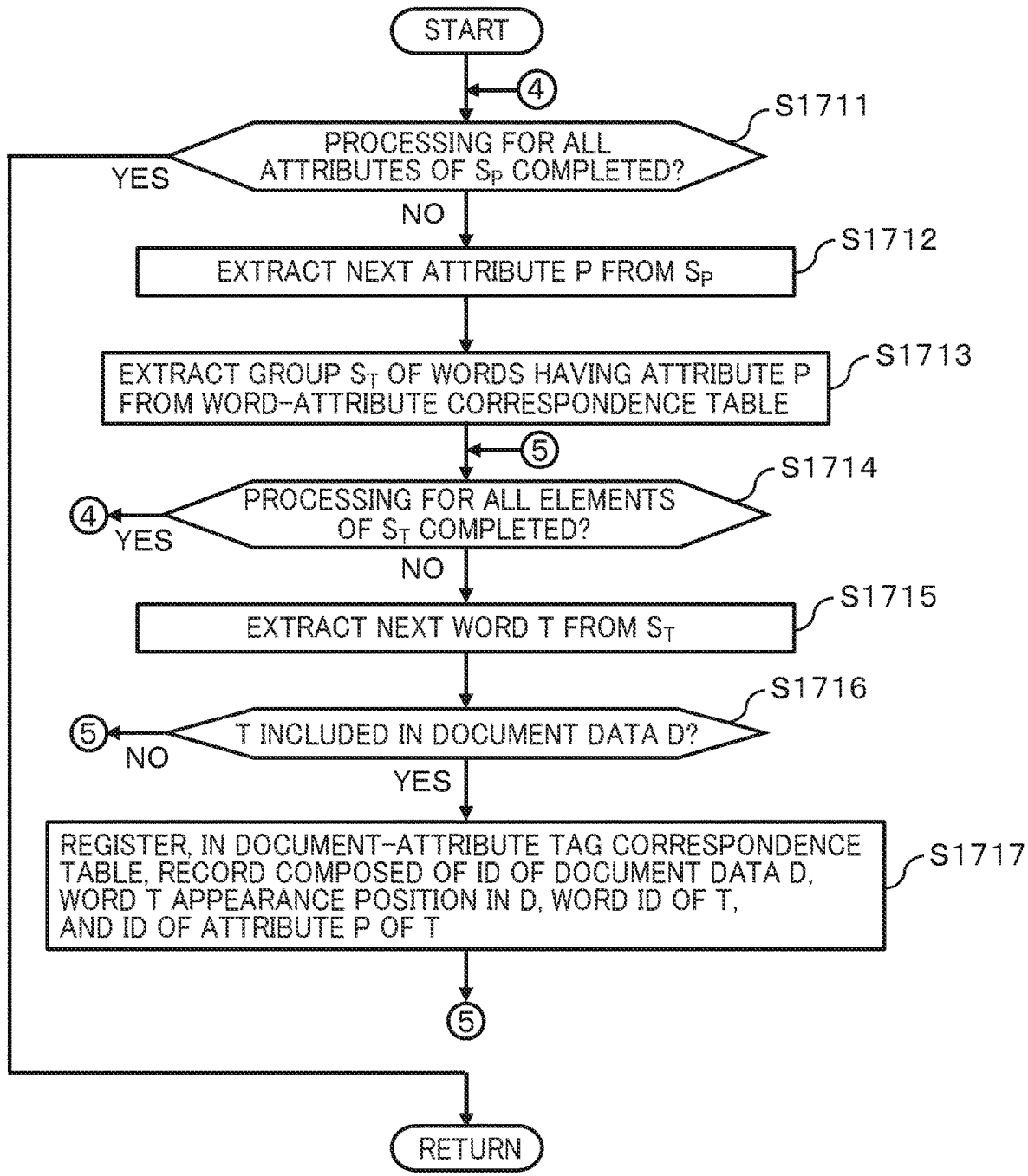
FIG. 17 is a flowchart illustrating attribute tag assignment processing.

FIG. 17 is a flowchart illustrating the attribute tag assignment processing S1616 in FIG. 16. Hereinafter, the attribute tag assignment processing S1616 will be described with reference to the drawing. In the following description, $S_P$ represents a group of attributes included in attribute relation sets $R_1, R_2, - - - R_e$ (e is a positive integer) selected by the user.

First, the dictionary update processing unit 120 determines whether the attribute tag assignment processing S1616 has been performed for all the attributes included in the attribute group $S_P$ (S1711). When the attribute tag assignment processing S1616 has been processed for all the attributes included in the attribute group $S_P$ (YES in step S1711), the dictionary update processing unit 120 terminates the attribute tag assignment processing S1616. On the other hand, if the attribute tag assignment processing S1616 is not yet completed for all the attributes included in the attribute group $S_P$ (NO in step S1711), the dictionary update processing unit 120 extracts the next attribute P from the attribute group $S_P$ (S1712).

Subsequently, the dictionary update processing unit 120 extracts a group $S_T$ of words having the attribute P from the word-attribute correspondence table 162 (S1713).

Subsequently, the dictionary update processing unit 120 determines whether the attribute tag assignment processing S1616 has been performed for all elements constituting the word group $S_T$ (S1714). When the attribute tag assignment processing S1616 has been performed for all elements constituting the word group $S_T$ (YES in step S1714), the processing returns to step S1711. On the other hand, if the attribute tag assignment processing S1616 is not yet completed for all elements constituting the word group $S_T$ (NO in step S1714), the dictionary update processing unit 120 extracts the next word T from the word group $S_T$ (S1715).

Subsequently, the dictionary update processing unit 120 determines whether the word T is included in the current document data D selected in step S1615 of FIG. 16 (S1716). When the currently selected document data D does not include the word T (NO in step S1716), the processing returns to step S1714. On the other hand, if the word T is included in the currently selected document data D (YES in step S1716), the dictionary update processing unit 120 registers, in the document-attribute tag correspondence table 151, a record composed of document ID of document data D, word T appearance position in document data D, word ID of word T, and ID of attribute P of word T (S1717). Subsequently, the processing returns to step S1714.

Figure 18:
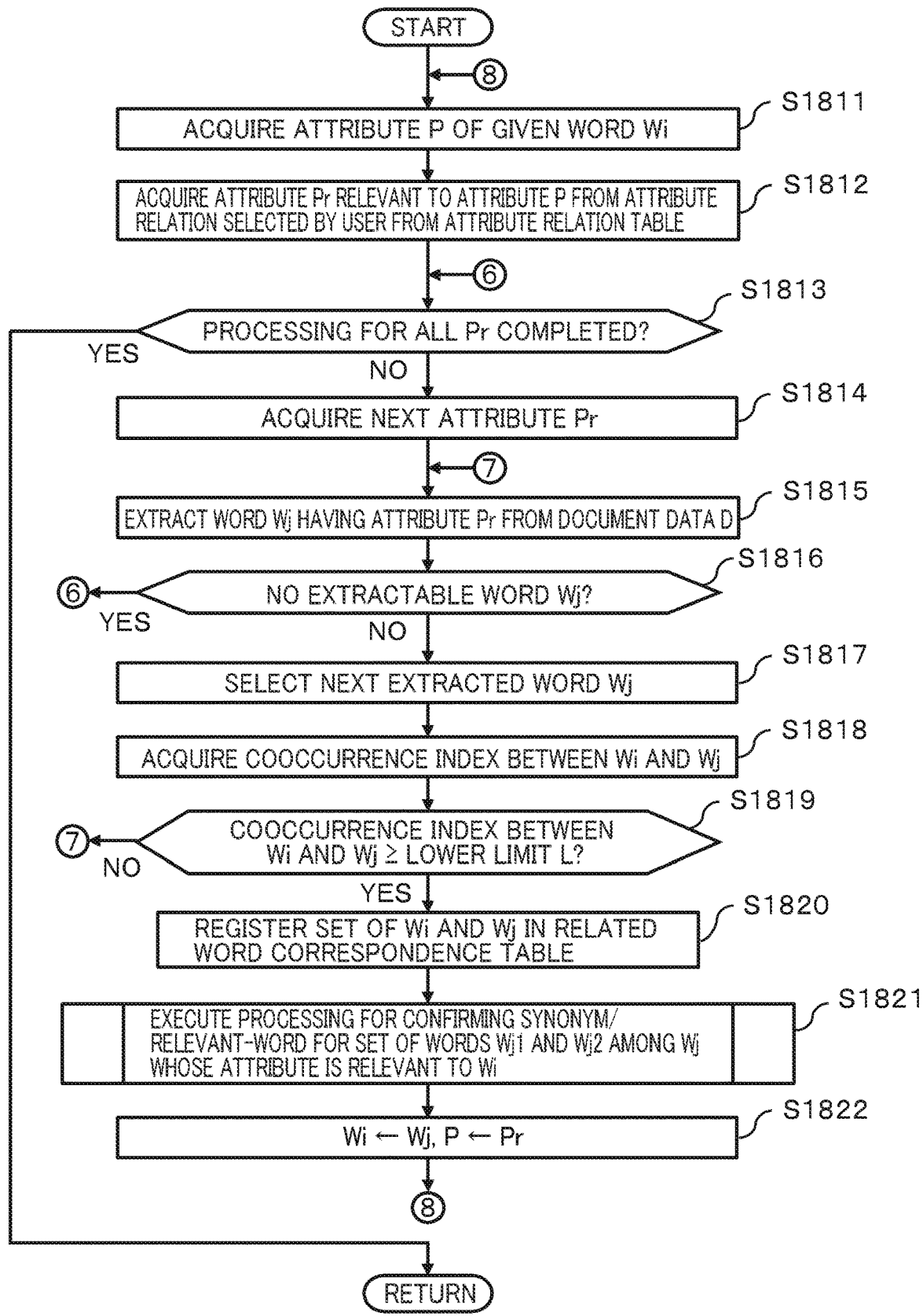
FIG. 18 is a flowchart illustrating attribute relation word search processing.

FIG. 18 is a flowchart illustrating the attribute relation word search processing S1622 in FIG. 16. Hereinafter, the attribute relation word search processing S1622 will be described with reference to the drawing.

First, the dictionary update processing unit 120 acquires the attribute P of the word Wi assigned in step S1622 of FIG. 16, with reference to the word-attribute correspondence table 162 (S1811).

Subsequently, the dictionary update processing unit 120 acquires the attribute Pr relevant to the attribute P, from the attribute relation that the user has selected from the attribute relation table 161 (S1812).

Subsequently, the dictionary update processing unit 120 determines, for all attributes Pr, whether the attribute relation word search processing has been completed (S1813). When the attribute relation word search processing has been completed for all attributes Pr (YES in step S1813), the dictionary update processing unit 120 terminates the attribute relation word search processing S1622. On the other hand, if the attribute relation word search processing is not completed for all attributes Pr (NO in step S1813), the dictionary update processing unit 120 acquires the next attribute Pr (S1814).

Subsequently, the dictionary update processing unit 120 extracts a word Wj having the attribute Pr from the document data D (S1815). At this time, the dictionary update processing unit 120 determines whether the document data D includes an extractable word Wj (S1816). When there is no word Wj extractable from the document data D (YES in step S1816), the processing returns to step S1813. On the other hand, if the word Wj that can be extracted from the document data D is present (NO in step S1816), the dictionary update processing unit 120 selects the next extracted word Wj (S1817).

Subsequently, the dictionary update processing unit 120 acquires the cooccurrence index between the word Wi and the word Wj from the word cooccurrence index calculation results 153 (S1818).

Subsequently, the dictionary update processing unit 120 determines whether the cooccurrence index between the word Wi and the word Wj is equal to or greater than the lower limit L (S1819). When the cooccurrence index between the word Wi and the word Wj is less than the lower limit L (NO in step S1819), the processing returns to step S1815. On the other hand, if the cooccurrence index between the word Wi and word Wj is equal to or greater than the lower limit L (YES in step S1819), the dictionary update processing unit 120 sets the set of the word Wi and the word Wj in the related word correspondence table 152 (S1820).

Subsequently, the dictionary update processing unit 120 executes processing for confirming synonyms and relevant words for the set of words Wj1 and Wj2 among the words Wj whose attribute is relevant to the word Wi (hereinafter, this processing is referred to as "synonym/relevant-word confirmation processing S1821") (S1821).

Subsequently, the dictionary update processing unit 120 sets Wj to Wi and sets Pr to P. Then, the processing returns to step S1811 (S1822).

Figure 19:
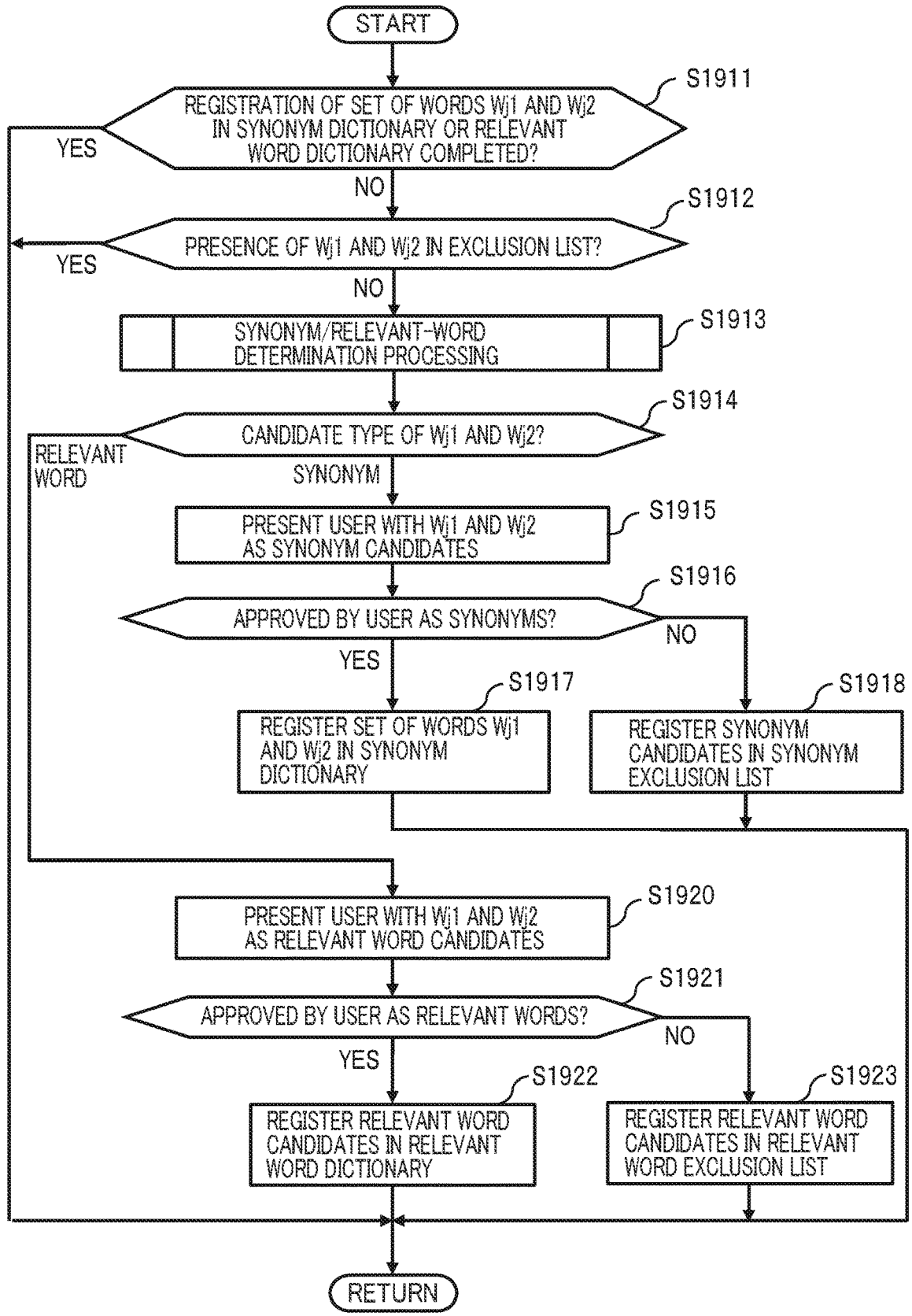
FIG. 19 is a flowchart illustrating synonym/relevant-word confirmation processing.

FIG. 19 is a flowchart illustrating the synonym/relevant-word confirmation processing S1821 in FIG. 18. Hereinafter, the synonym/relevant-word confirmation processing S1821 will be described with reference to the drawing.

First, the dictionary update processing unit 120 determines whether the set of words Wj1 and Wj2 is already registered in the synonym dictionary 163 or the relevant word dictionary 165 (S1911). When the set of words Wj1 and Wj2 is already registered in the synonym dictionary 163 or the relevant word dictionary 165 (YES in step S1911), the dictionary update processing unit 120 terminates the synonym/relevant-word confirmation processing S1821.

If the set of words Wj1 and Wj2 is not yet registered in the synonym dictionary 163 or the relevant word dictionary 165 (NO in step S1911), the dictionary update processing unit 120 determines whether the set of words Wj1 and Wj2 is already registered in the synonym exclusion list 164 or the relevant word exclusion list 166 (S1912). When the set of words Wj1 and Wj2 is already registered in the synonym exclusion list 164 or the relevant word exclusion list 166 (YES in step S1912), the dictionary update processing unit 120 terminates the synonym/relevant-word confirmation processing S1821.

On the other hand, if the set of words Wj1 and Wj2 is not yet registered in the synonym exclusion list 164 or the relevant word exclusion list 166 (NO in step S1912), the dictionary update processing unit 120 performs processing for determining the synonymity or relevancy about the set of words Wj1 and Wj2 (hereinafter, referred to as "synonym/relevant-word determination processing S1913"). The synonym/relevant-word determination processing S1913 will be described in detail below.

Subsequently, the dictionary update processing unit 120 determines, as the return value from the synonym/relevant-word determination processing S1913, whether the set of words Wj1 and Wj2 has been determined as synonym candidates or relevant word candidates (S1914). When the set of words Wj1 and Wj2 is determined as synonym candidates (synonym in step S1914), the processing proceeds to step S1915. On the other hand, when the set of words Wj1 and Wj2 is determined as relevant word candidates (relevant word in step S1914), the processing proceeds to step S1920.

In step S1915, the dictionary update processing unit 120 presents the user via the user terminal 2 with the set of words Wj1 and Wj2 as synonym candidates. Then, the dictionary update processing unit 120 accepts, from the user, an entry of intent as to whether to approve these words as synonyms (S1916). When the user has approved the set of words Wj1 and Wj2 as synonyms (YES in step S1916), the dictionary update processing unit 120 registers the set of words Wj1 and Wj2 in the synonym dictionary 163 (S1917), and terminates the synonym/relevant-word confirmation processing S1821. On the other hand, if the user has not approved the set of words Wj1 and Wj2 as synonyms (NO in step S1916), the dictionary update processing unit 120 registers the set of words Wj1 and Wj2 in the synonym exclusion list 164 (S1918), and terminates the synonym/relevant-word confirmation processing S1821.

In step S1920, the dictionary update processing unit 120 presents the user via the user terminal 2 with the set of words Wj1 and Wj2 as relevant word candidates. Then, the dictionary update processing unit 120 accepts, from the user, an entry of intent as to whether to approve these words as relevant words (S1921). When the user has approved the set of words Wj1 and Wj2 as relevant words (YES in step S1921), the dictionary update processing unit 120 registers the set of words Wj1 and Wj2 in the relevant word dictionary 165 (S1922), and terminates the synonym/relevant-word confirmation processing S1821. On the other hand, if the user has not approved the set of words Wj1 and Wj2 as relevant words (NO in step S1921), the dictionary update processing unit 120 registers the set of words Wj1 and Wj2 in the relevant word exclusion list 166 (S1923), and terminates the synonym/relevant-word confirmation processing S1821.

Figure 20:
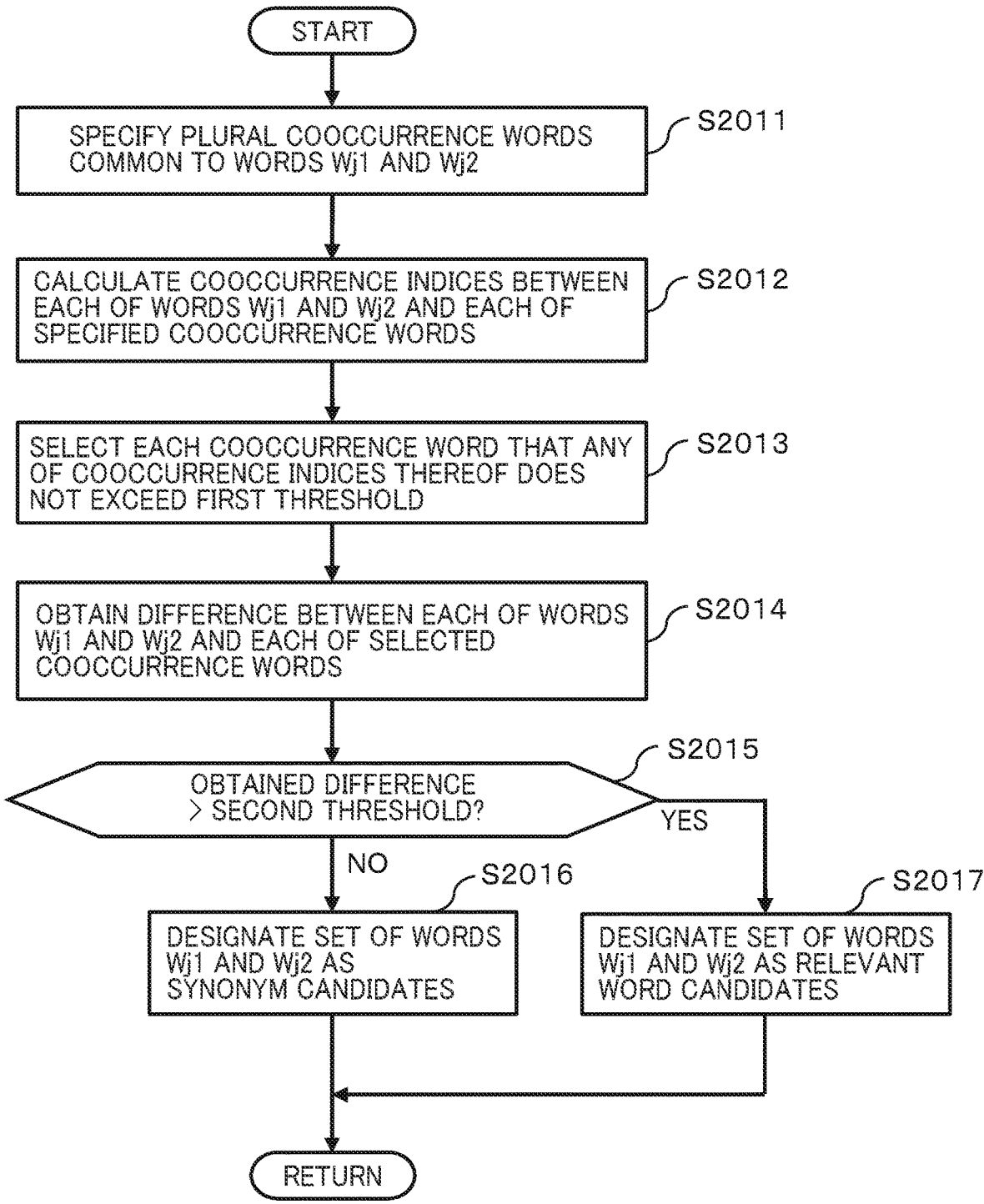
FIG. 20 is a flowchart illustrating synonym/relevant-word determination processing.

FIG. 20 is a flowchart illustrating the synonym/relevant-word determination processing S1913 in FIG. 19. Hereinafter, the synonym/relevant-word determination processing S1913 will be described with reference to the drawing.

First, the dictionary update processing unit 120 specifies a plurality of cooccurrence words common to the word Wj1 (first word) and the word Wj2 (second word) (S2011). This cooccurrence word specification can be realized, for example, by setting the lower limit L to a value smaller than the value when selecting the set of words Wj1 and Wj2 in step S1819 of the attribute relation word search processing S1622 in FIG. 18 and performing the attribute relation word search processing S1622 in FIG. 18. However, the cooccurrence word specification may be performed by another known method.

Subsequently, the dictionary update processing unit 120 obtains cooccurrence indices between the words Wj1 and Wj2 and the cooccurrence words specified in step S2011 (S2012). The results obtained here correspond to, for example, respective values in the table of FIG. 11.

Subsequently, the dictionary update processing unit 120 selects, from the specified cooccurrence words, each cooccurrence word if any of the cooccurrence indices thereof obtained in step S2012 does not exceed the first threshold 171 (S2013). The cooccurrence words selected here correspond to the cooccurrence words "blood" and "subcutaneous fat" other than the cooccurrence words surrounded by the thick frame line in the example illustrated in FIG. 11.

Subsequently, the dictionary update processing unit 120 obtains a difference between each of the words Wj1 and Wj2 and each of the selected cooccurrence words (S2014). The obtained differences here correspond to values of the item "cooccurrence word difference" in the table of FIG. 12.

Subsequently, the dictionary update processing unit 120 determines whether the obtained difference exceeds the second threshold 172 (S2015). If the difference does not exceed the second threshold 172 (NO in step S2015), the dictionary update processing unit 120 designates the set of words Wj1 and Wj2 as synonym candidates (S2016), and further terminates the synonym/relevant-word determination processing S1913. On the other hand, if the above difference exceeds the second threshold 172 (YES in step S2015), the dictionary update processing unit 120 designates the set of words Wj1 and Wj2 as relevant word candidates (S2017), and further terminates the synonym/relevant-word determination processing S1913.

The above is the description of the dictionary update processing S1600.

Figure 21:
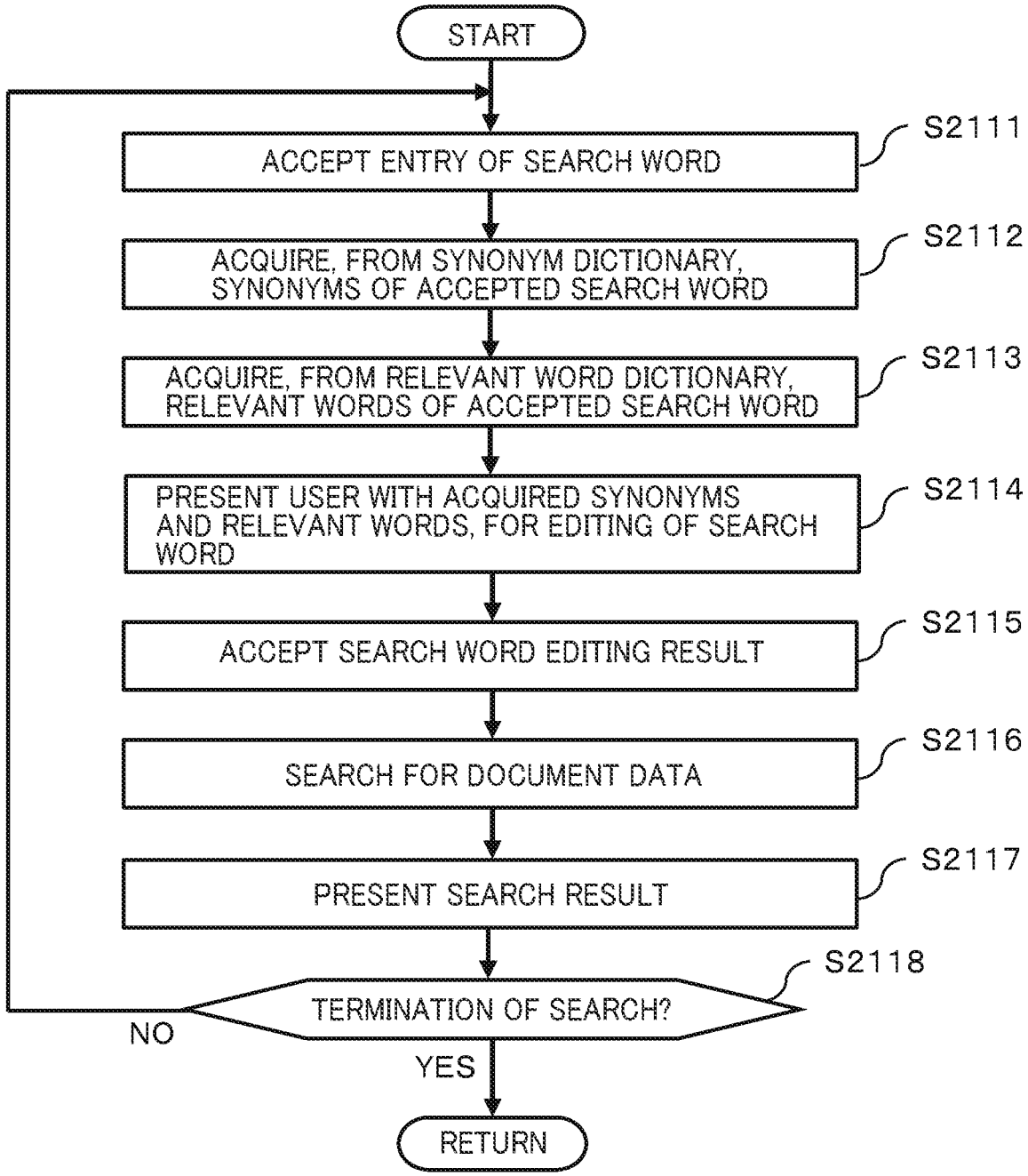
FIG. 21 is a flowchart illustrating document search processing.

FIG. 21 is a flowchart illustrating processing (hereinafter, referred to as "document search processing S2100") that the document search device 10 performs when searching the document data 160. Hereinafter, the document search processing S2100 will be described with reference to the drawing.

First, the document search unit 135 accepts, via the user terminal 2, an entry of a search word from a user (S2111).

Subsequently, the document search unit 135 acquires, from the synonym dictionary 163, synonyms of the accepted search word (S2112).

Subsequently, the document search unit 135 acquires, from the relevant word dictionary 165, relevant words of the accepted search word (S2113).

Subsequently, the document search unit 135 presents the user with the acquired synonyms and the relevant words, for editing of the search word (S2114).

Subsequently, the document search unit 135 accepts, from the user, a result of editing the search word (S2115).

Subsequently, the document search unit 135 accesses the data management device 4 and searches for the document data 160 including the edited search word accepted from the user (S2116), and presents the result to the user via the user terminal 2 (S2117).

Subsequently, the document search unit 135 accepts, via the user terminal 2, an entry of user intent as to whether to continue the search (S2118). When the user has indicated the intent to terminate the search (YES in step S2118), the document search unit 135 terminates the document search processing S2100. When the user has indicated the intent to continue the search (NO in step S2118), the processing returns to step S2111.

For example, when starting the document search processing S2100, the document search unit 135 may confirm whether the attribute relation table 161 has been updated. And, after confirming the update, the document search unit 135 may perform the dictionary update processing S1600. Further, when an instruction to execute the dictionary update processing S1600 is accepted from the user before or during the execution of the document search processing S2100, the document search unit 135 may perform the dictionary update processing S1600.

Figure 22:
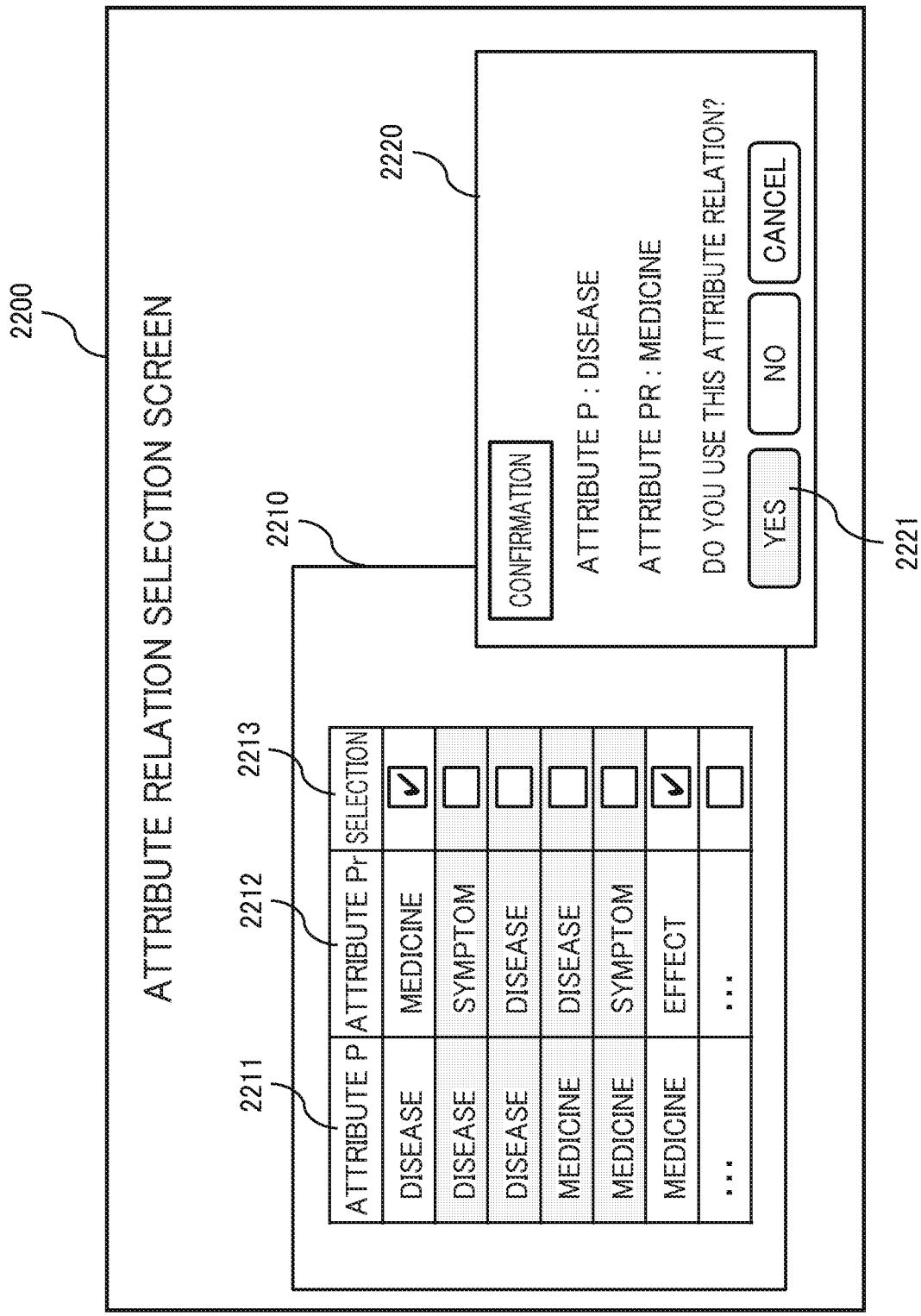
FIG. 22 illustrates an example of an attribute relation selection screen.

FIG. 22 illustrates an exemplary screen (hereinafter, referred to as "attribute relation selection screen 2200") to be displayed on the user terminal 2 when letting a user select the attribute relation to be applied in step S1612 of FIG. 16. The illustrated attribute relation selection screen 2200 includes an attribute relation selection field 2210. The attribute relation selection field 2210 includes fields 2211 and 2212 for displaying a set of an attribute P and a relevant attribute Pr, and a check box for enabling a user to select an attribute relation (hereinafter, referred to as "attribute relation selection field 2213").

The user can designate an attribute relation to be applied by checking the attribute relation selection field 2213 and can register the selected attribute relation to the document search device 10 by selecting a "YES" button 2221 when a selection confirmation screen 2220 is displayed. The document search device 10 performs processing by applying the attribute relation selected by the user in the dictionary update processing S1600 of FIG. 16.

Figure 23:
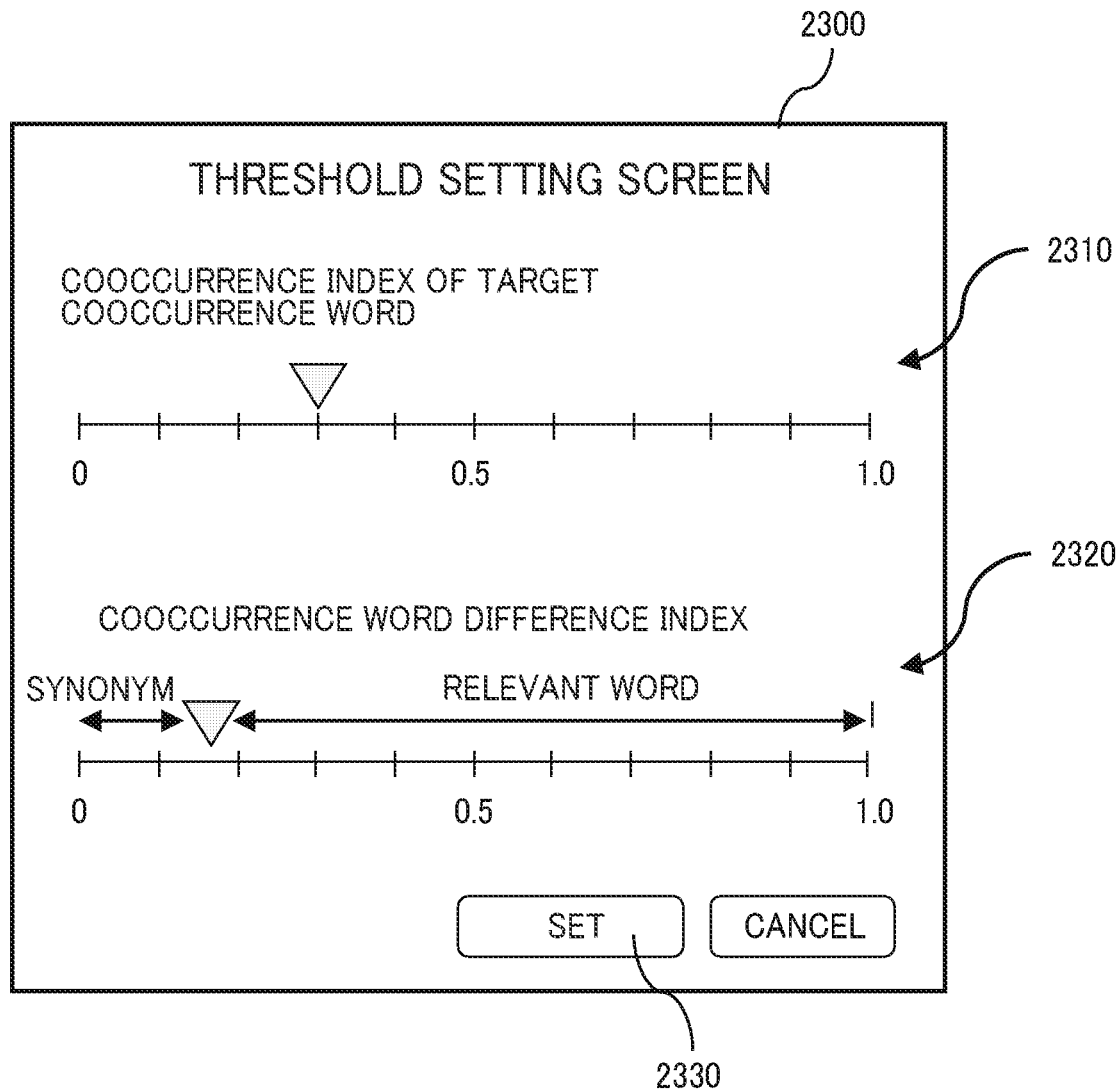
FIG. 23 illustrates an example of a threshold setting screen.

FIG. 23 illustrates an exemplary screen (hereinafter, referred to as "threshold setting screen 2300") to be displayed on the user terminal 2 when a condition setting unit 126 enables a user to set the first threshold 171 and the second threshold 172. The illustrated threshold setting screen 2300 includes a first threshold setting field 2310 used for setting the first threshold 171, a second threshold setting field 2320 used for setting the second threshold 172, and a setting button 2330.

The user can easily adjust the first threshold 171 by operating a slider displayed on the first threshold setting field 2310, and also can easily adjust the second threshold 172 by operating a slider on the second threshold setting field 2320. Then, the user can register the first and second thresholds having been set, by operating the setting button 2330, to the document search device 10.

In addition, the user can adjust the first threshold 171 and the second threshold 172 on the threshold setting screen 2300, for example, in step S2114 of the document search processing S2100 illustrated in FIG. 21, to adjust the range of the synonyms and the relevant words presented by the document search device 10.

Figure 24:
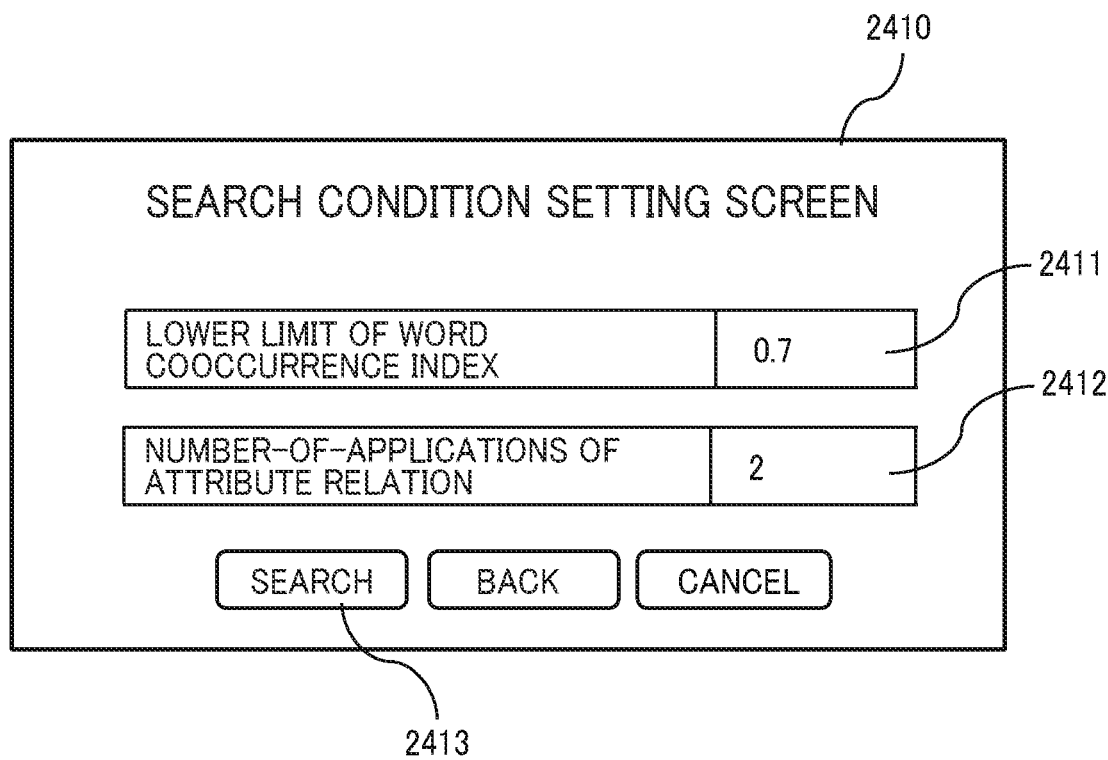
FIG. 24 illustrates an example of a search condition setting screen.

FIG. 24 illustrates an exemplary screen (hereinafter, referred to as "search condition setting screen 2410") to be displayed on the user terminal 2 in step S1613 of FIG. 16 in which the condition setting unit 126 enables a user to set the number-of-applications k of attribute relation and the lower limit L of word cooccurrence index. The illustrated search condition setting screen 2410 includes a setting field 2411 for the lower limit L of word cooccurrence index, a setting field 2412 for the number-of-applications k of attribute relation, and a search button 2413.

When the user sets the lower limit L of word cooccurrence index in the setting field 2411 and the number-of-applications k of attribute relation in the setting field 2412 and operates the search button 2413, the processing of step S1614 of FIG. 16 starts.

Figure 25:
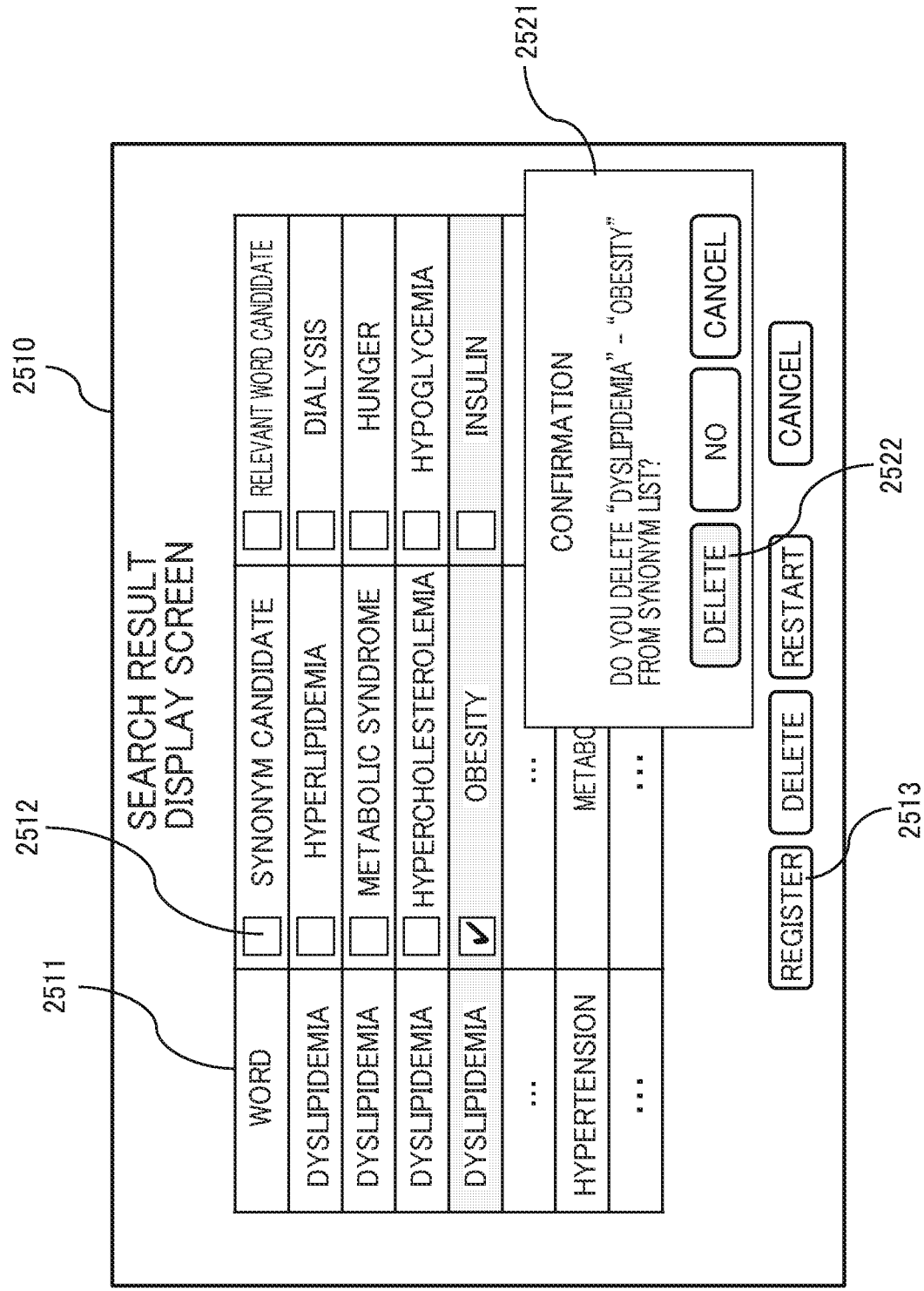
FIG. 25 illustrates an example of a search result display screen.

FIG. 25 illustrates an exemplary screen (hereinafter, referred to as "search result display screen 2510") to be displayed when the document search device 10 presents the user via the user terminal 2 with the synonym candidates and the relevant word candidates in the synonym/relevant-word confirmation processing S1821 of FIG. 19. The illustrated search result display screen 2510 includes a synonym/relevant word candidate display field 2511, a check field 2512, a registration button 2513, an exclusion list registration confirmation screen 2521, and a deletion button 2522.

In the synonym/relevant word candidate display field 2511, the synonym candidates and the relevant word candidates are displayed. When the user checks each check field 2512 of a set of synonym/relevant-word candidates to be registered and operates the registration button 2513, the checked set of candidates is registered to the synonym dictionary 163 or the relevant word dictionary 165.

Further, when the user confirms the synonym/relevant-word candidates displayed on the exclusion list registration confirmation screen 2521 and operates the deletion button 2522, each deleted candidate is registered in the synonym exclusion list 164 or the relevant word exclusion list 166.

As described above, the document search device 10 according to the present embodiment specifies a plurality of cooccurrence words common to the first word and the second word, and determines the synonymity or relevancy about the first word and second word based on cooccurrence indices between the specified cooccurrence words and the first/second words. Therefore, the synonymity or relevancy about two words extracted from the document data 160 can be determined semi-automatically and accurately. Further, since the document search device 10 presents a user with synonyms and relevant words separately, the user can set a search word appropriately and flexibly for searching the target document data 160 using the synonyms and the relevant words. As described above, the document search device 10 according to the present embodiment can improve the accuracy in determining synonyms and relevant words while reducing the human workload.

Although some embodiments of the present invention have been described, the present invention is not limited to the described embodiments and can be changed or modified in various ways without departing the gist thereof. For example, the above-described embodiments have been described in detail for easy understanding of the present invention, and the present invention is not necessarily limited to those having all the described configurations. Further, regarding the configurations of the above-described embodiments, it is possible to add another configuration, remove some, or replace a part with another configuration.

In addition, each of the above-described configurations, functional units, processing units, and processing means and the like may be partly or entirely realized by hardware, for example, by designing an integrated circuit. Further, each of the above-described configurations and functions may be realized by software, for example, by a processor that can interpret and execute programs realizing these functions. Information such as the programs realizing these functions, tables, and files can be stored in a recording device such as a memory, a hard disk drive (HDD), or a solid state drive (SSD) or in a recording medium such as an IC card, an SD card, or a digital versatile disk (DVD).

Further, in each of the above drawings, control lines and information lines show the ones considered to be necessary for explanation, and the drawings do not necessarily indicate all control lines and information lines actually mounted. For example, it may be considered that almost all configurations are actually connected to each other.

In the above-described information processing devices, the arrangement and form of the various functional units, various processing units, and various databases are merely examples. From the viewpoints of the performance, processing efficiency, communication efficiency and the like of the hardware and software included in these devices, the arrangement and form of the various functional units, various processing units, and various databases can be changed to the optimum arrangement and form.

The configuration (schema, etc.) of the database that stores the various data can be flexibly changed from the viewpoints of efficient use of resources, improvement of processing efficiency, improvement of access efficiency, improvement of search efficiency, and the like.

Although the present disclosure has been described with reference to example embodiments, those skilled in the art will recognize that various changes and modifications may be made in form and detail without departing from the spirit and scope of the claimed subject matter.

What is claimed is:

1. An information processing device comprising:
  a storage device storing thereon at least one program;
  a processor which executes the at least one program to configure the processor to:
  specify a plurality of cooccurrence words common to a first word and a second word; and
  determine synonymity or relevancy of the first word and the second word based on cooccurrence indices between the specified cooccurrence words and each of the first and second words,
  wherein the first and second words are words determined as synonym candidates by a predetermined algorithm that determines the synonymity of the first and second words,
  wherein based on a cooccurrence index between a word having a first attribute and a word having a second attribute related to the first attribute, the first and second words are words determined as the synonym candidates by determining the synonymity between words commonly having the second attribute, wherein the first word and the second word are words determined as the synonym candidates by obtaining a first cooccurrence index between a third word having the first attribute and a fourth word having the second attribute, obtaining a second cooccurrence index between the third word having the first attribute and a fifth word having the second attribute, and determining synonymity of the fourth word and the fifth word based on the first cooccurrence index and the second cooccurrence index.

2. The information processing device according to claim 1, wherein the processor is further configured to select from among the specified cooccurrence words, one cooccurrence word in which at least one of cooccurrence indices between the specified cooccurrence word and the first and second words does not exceed a preset first threshold, and obtain a difference in cooccurrence index between each selected cooccurrence word and each of the first and second words, if the difference exceeds a preset second threshold, the processor determines the first and second words as relevant word candidates, and if the difference does not exceed the second threshold, the processor determines the first and second words as synonym candidates.

3. The information processing device according to claim 1, wherein when the first cooccurrence index and the second cooccurrence index are equal to or greater than a preset lower limit, the processor is configured to determine the fourth word and the fifth word as the synonym candidates.

4. The information processing device according to claim 2, wherein the processor is communicably connected to a user interface and is configured to accept, via the user interface, setting of the first threshold from a user.

5. The information processing device according to claim 2, wherein the processor is communicably connected to a user interface and is configured to accept, via the user interface, setting of the second threshold from a user.

6. The information processing device according to claim 2, wherein the processor is communicably connected to a user interface, and is configured to present a user with a determination result indicating whether to designate the first and second words as the synonym candidates or relevant word candidates, via the user interface.

7. An information processing method comprising the steps of:

specifying a plurality of cooccurrence words common to a first word and a second word; and determining synonymity or relevancy of the first word and the second word based on cooccurrence indices between the specified cooccurrence words and each of the first and second words, wherein the first and second words are words determined as synonym candidates by a predetermined algorithm that determines the synonymity of the first and second words, wherein based on a cooccurrence index between a word having a first attribute and a word having a second attribute related to the first attribute, the first and second words are words determined as the synonym candidates by determining the synonymity between words commonly having the second attribute, wherein the first word and the second word are words determined as the synonym candidates by obtaining a first cooccurrence index between a third word having the first attribute and a fourth word having the second attribute, obtaining a second cooccurrence index between the third word having the first attribute and a fifth word having the second attribute, and determining synonymity of the fourth word and the fifth word based on the first cooccurrence index and the second cooccurrence index.

8. The information processing method according to claim 7, wherein the information processing device selects, from among the specified cooccurrence words, one cooccurrence word in which at least one of cooccurrence indices between the specified cooccurrence word and the first and second words does not exceed a preset first threshold, and obtains a difference in cooccurrence index between each selected cooccurrence word and each of the first and second words, if the difference exceeds a preset second threshold, the information processing device determines the first and second words as relevant word candidates, and if the difference does not exceed the second threshold, the information processing device determines the first and second words as synonym candidates.

* * * * *